(12) United States Patent
Haller et al.

(10) Patent No.: US 11,885,124 B2
(45) Date of Patent: Jan. 30, 2024

(54) PREFABRICATED CONSTRUCTION WALL ASSEMBLY

(71) Applicant: VEEV GROUP, INC., San Mateo, CA (US)

(72) Inventors: Amit Haller, Belmont, CA (US); Israel Gershman, Yahud (IL); Nir Refaeli, Kiryat Ono (IL); Tamar Yaniv, Ramat HaSharon (IL); Dana Raichel, Tel Aviv (IL)

(73) Assignee: VEEV GROUP, INC., San Mateo, CA (US)

( * ) Notice: Subject to any disclaimer, the term of this patent is extended or adjusted under 35 U.S.C. 154(b) by 205 days.

(21) Appl. No.: 17/258,552

(22) PCT Filed: Jul. 11, 2019

(86) PCT No.: PCT/IL2019/050781
§ 371 (c)(1),
(2) Date: Jan. 7, 2021

(87) PCT Pub. No.: WO2020/012484
PCT Pub. Date: Jan. 16, 2020

(65) Prior Publication Data
US 2021/0148115 A1    May 20, 2021

Related U.S. Application Data

(60) Provisional application No. 62/696,768, filed on Jul. 11, 2018.

(51) Int. Cl.
*E04B 2/74* (2006.01)
*E04B 2/00* (2006.01)
*E04B 2/02* (2006.01)

(52) U.S. Cl.
CPC .............. *E04B 2/7457* (2013.01); *E04B 2/00* (2013.01); *E04B 2002/0282* (2013.01); *E04B 2002/7468* (2013.01); *E04B 2002/7477* (2013.01)

(58) Field of Classification Search
CPC . E04C 2/34; E04C 2/3405; E04C 2/46; E04B 2/7457; E04B 2002/0282; E04B 2002/7468; E04B 2002/7477
(Continued)

(56) References Cited

U.S. PATENT DOCUMENTS 4,072,141 A    2/1978 Fillios et al.
4,295,415 A * 10/1981 Schneider, Jr. ....... F24D 11/007
454/366
(Continued)

FOREIGN PATENT DOCUMENTS

WO    2006000320 A1    1/2006

OTHER PUBLICATIONS

International Search Report and Written Opinion for International Application No. PCT/IL2019/050781 dated Jan. 5, 2020.

*Primary Examiner* — Brian E Glessner
*Assistant Examiner* — Adam G Barlow
(74) *Attorney, Agent, or Firm* — Dorsey & Whitney LLP

(57) ABSTRACT

A prefabricated construction wall assembly comprising: a frame structure having a first thermal expansion coefficient; and a panel configured for covering at least a majority of the a face of the frame structure, said panel having a second thermal expansion coefficient different from the first thermal expansion coefficient, and a solid-surface exterior face exposed to an exterior of the wall assembly and an interior face connected to the face of the frame structure so as to withstand the thermal structural differences between the frame structure and the exterior face.

13 Claims, 16 Drawing Sheets

(58) Field of Classification Search
USPC .............................. 52/303.1, 483.1, 474, 478
See application file for complete search history.

(56) References Cited

U.S. PATENT DOCUMENTS

| | | | |
|---|---|---|---|
| 4,522,002 A | 6/1985 | Davis et al. | |
| 4,652,321 A * | 3/1987 | Greko | B29C 66/12441 |
| | | | 156/196 |
| 4,843,786 A * | 7/1989 | Walkinshaw | E02D 31/008 |
| | | | 454/251 |
| 5,444,947 A * | 8/1995 | Miller | E04B 1/7076 |
| | | | 52/302.1 |
| 5,623,801 A | 4/1997 | Drumbl | |
| 5,749,187 A * | 5/1998 | Umehara | E04B 2/7409 |
| | | | 52/407.3 |
| 6,279,284 B1 * | 8/2001 | Moras | E04F 13/007 |
| | | | 52/483.1 |
| 6,361,433 B1 * | 3/2002 | Gray | F24F 13/084 |
| | | | 454/359 |
| 6,427,408 B1 * | 8/2002 | Krieger | E04F 13/0812 |
| | | | 52/762 |
| 6,484,460 B2 * | 11/2002 | VanHaitsma | E04B 1/0007 |
| | | | 52/274 |
| 6,694,694 B2 * | 2/2004 | Zeeff | E04C 2/08 |
| | | | 52/510 |
| 6,754,997 B2 * | 6/2004 | Bonin | E04B 1/7069 |
| | | | 52/302.1 |
| 6,796,100 B1 * | 9/2004 | Venezia | E04D 13/152 |
| | | | 52/302.1 |
| 7,814,709 B1 * | 10/2010 | Resech | E04D 13/1407 |
| | | | 52/302.1 |
| 7,849,649 B2 * | 12/2010 | Tonyan | B32B 13/02 |
| | | | 106/735 |
| 7,870,698 B2 * | 1/2011 | Tonyan | E04B 1/0007 |
| | | | 428/192 |
| 7,980,035 B1 * | 7/2011 | D'Apolito | E04B 1/7069 |
| | | | 52/302.1 |
| 8,146,314 B2 * | 4/2012 | Nguyen | E04B 1/14 |
| | | | 52/762 |
| 8,397,438 B2 * | 3/2013 | Hoy | E04D 13/1407 |
| | | | 52/302.1 |
| 8,397,465 B2 * | 3/2013 | Hansbro | E04B 2/58 |
| | | | 52/309.14 |
| 8,959,748 B2 | 2/2015 | Olson | |
| 9,574,341 B2 * | 2/2017 | Ciuperca | E04B 2/58 |
| 9,909,303 B2 * | 3/2018 | Ochi | E04F 13/0803 |
| 2002/0029535 A1 * | 3/2002 | Loper | E04F 17/00 |
| | | | 52/302.1 |
| 2003/0140572 A1 * | 7/2003 | Hertzog | E04F 13/0853 |
| | | | 52/220.8 |
| 2005/0055920 A1 * | 3/2005 | Lajewski | F24F 13/084 |
| | | | 52/302.1 |
| 2009/0272051 A1 * | 11/2009 | Sipe | E04B 1/08 |
| | | | 52/483.1 |
| 2009/0288358 A1 * | 11/2009 | Snyder | E04F 19/061 |
| | | | 52/302.1 |
| 2010/0083600 A1 * | 4/2010 | Certuse, Jr. | F16L 5/00 |
| | | | 52/407.3 |
| 2011/0041441 A1 * | 2/2011 | Bui | E04C 2/384 |
| | | | 52/483.1 |
| 2011/0083389 A1 * | 4/2011 | Bui | E04C 2/384 |
| | | | 52/700 |
| 2011/0214364 A1 * | 9/2011 | Fuller | E04F 17/00 |
| | | | 52/302.1 |
| 2011/0258944 A1 * | 10/2011 | Radoane | E04B 1/6803 |
| | | | 52/220.8 |
| 2012/0023844 A1 * | 2/2012 | Certuse, Jr. | F16L 59/121 |
| | | | 52/404.1 |
| 2012/0174503 A1 * | 7/2012 | Milostic | E04B 2/7409 |
| | | | 52/480 |
| 2012/0174511 A1 * | 7/2012 | Harding | E04F 21/18 |
| | | | 294/93 |
| 2012/0216471 A1 * | 8/2012 | Manser | E04B 2/88 |
| | | | 52/302.1 |
| 2013/0145603 A1 | 6/2013 | Olson | |
| 2013/0269274 A1 * | 10/2013 | Certuse, Jr. | F16L 59/121 |
| | | | 52/407.3 |
| 2016/0060865 A1 * | 3/2016 | Lee | E04B 2/7407 |
| | | | 52/745.1 |

* cited by examiner

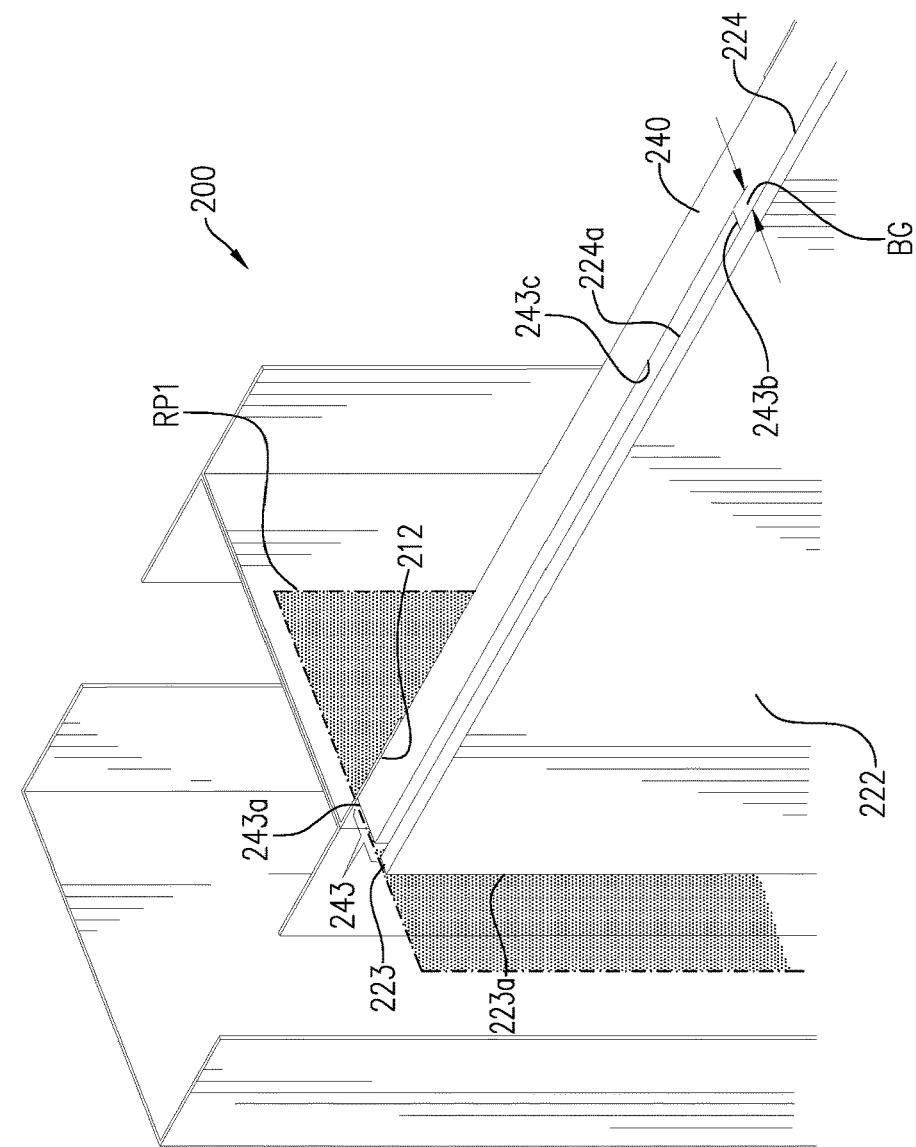
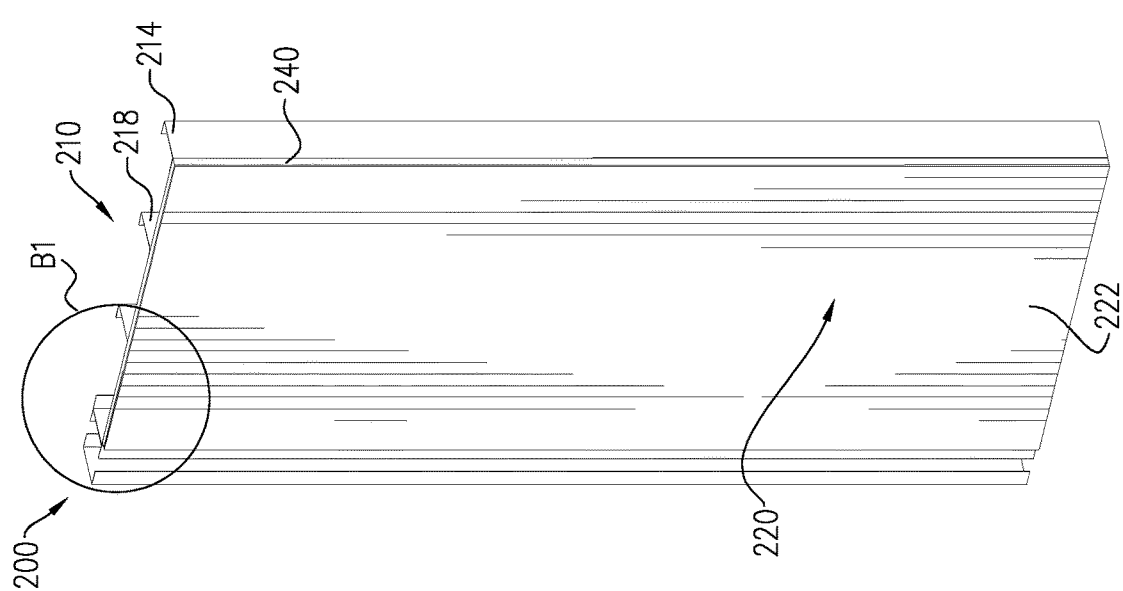
FIG. 2B
FIG. 2A

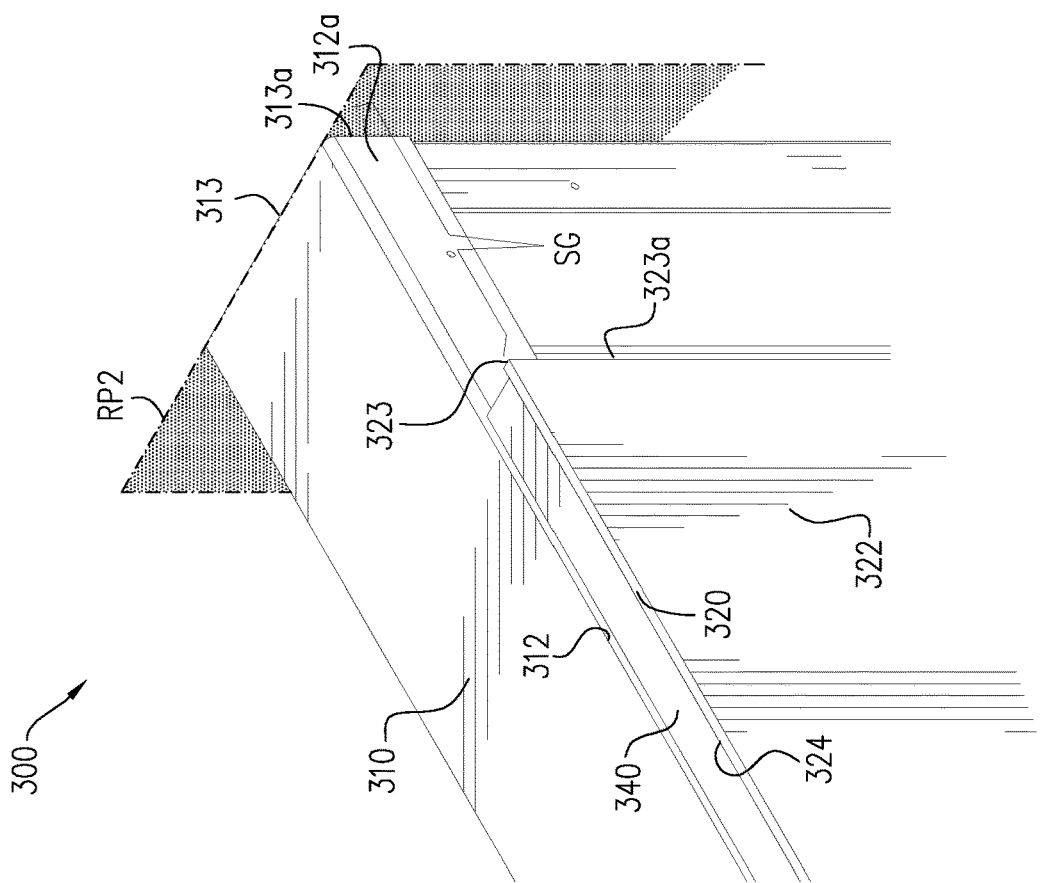
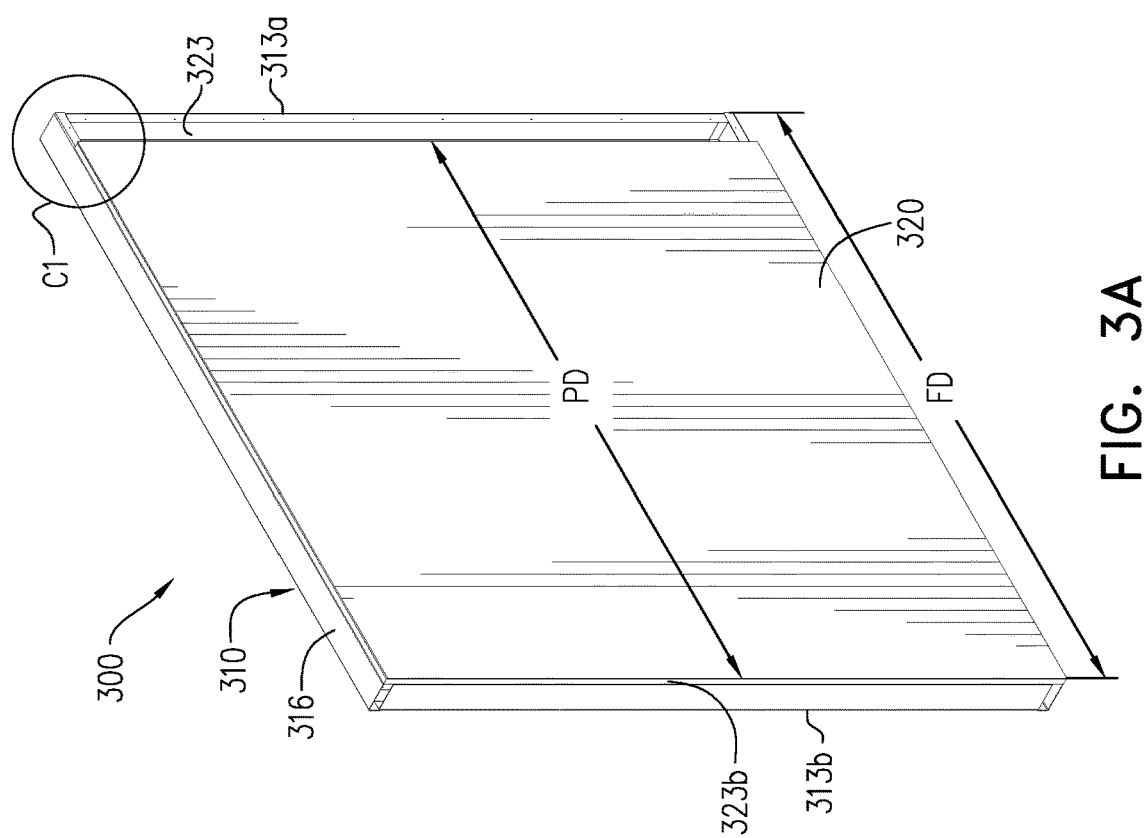
FIG. 3B
FIG. 3A

PREFABRICATED CONSTRUCTION WALL ASSEMBLY

TECHNOLOGICAL FIELD

The presently disclosed subject matter refers in general to the field of prefabricated construction wall assemblies for easy and/or fast construction of building structures.

BACKGROUND

The term prefabrication construction is commonly used to describe the practice of assembling several components of a structure together, prior to delivery, for example in a factory or a workshop. After the assembly is completed, the prefabrication walls are transported, as a whole or prefabricated sub-assemblies, to the construction site where they are structured together. This term is used to distinguish this process from the more conventional construction practice of transporting the basic materials to the construction site where the assembly is carried out.

Prefabricated wall constructions are commonly used for easy and/or fast construction of houses or as indoor walls used for dividing between two rooms. Most prefabricated walls are provided as frame constructions only, to which a drywall cover made of calcium sulfate dihydrate (gypsum) is connected at the construction site. Such drywall covers can be provided with or without additives, typically extruded between thick sheets of facer and backer paper. In most cased the cover is mixed with fiber (typically paper, fiberglass, asbestos, or a combination of these materials), plasticizer, foaming agent, and various additives that can reduce mildew, flammability, and water absorption. After construction of the prefabricated walls, the drywall cover is usually finished at the construction site by finishing techniques such as coating and painting.

General Description

The presently disclosed subject matter according to the aspects detailed below is related to various designs of prefabricated construction wall assemblies and parts thereof. These prefabricated construction wall assemblies are commonly constructed from horizontal and vertical beams e.g. tracks and studs, forming a frame structure and a panel to cover the frame wall facing the interior side of the room. Apposed to common prefabricated walls, the prefabricated construction wall assemblies of the presently disclosed subject matter according to the aspects detailed below, include an integral panel having a solid-surface exterior face, configured to be directed towards the interior of a building structure (e.g., a room, a house, a workspace, etc.). The solid-surface can be made of synthetic/man-made materials, for example, comprising one or more of the following materials: an acrylic polymer, a Methyl methacrylate (MMA), an alumina trihydrate (ATH), a polyester, epoxy, composite materials, and any combination thereof. The solid surface material can be characterized by one or more of the following: non-porous, impermeable, low-maintenance, stain resistant, thermoform-able, moisture resistant, heat resistant, easy to clean, anti-bacterial, hard-wearing, highly resistant, easy connectable to one other solid surface materials, and any combination thereof.

The exterior face can be factory-finished. This feature of the exterior face or of the entire panel allows using it 'as is', e.g., without requiring any further treatment and finishing after leaving the factory, such as applying coating, painting, etc.

The entire panel can be made of the same material and can have the same characteristics as the exterior face.

The solid-surface exterior face can be for example, one of the following: Coriae, Avonite Surfaces®, HI-MACS®, KRION®, etc.

The prefabricated construction wall assemblies of the presently disclosed subject matter can be manufactured and constructed in a factory or a workshop according to specific design requirements (e.g., architectural design) and in a precise manner, for example by a CNC machine, and ready to be transported to the construction site and assembled to each other on-site to form at least part of or an entire building structure (e.g., a room, a house, a workspace, etc.). The use of such prefabricated construction wall assemblies can allow structuring the building structure quickly and precisely, without requiring any further work on its exterior face. The prefabricated construction wall assembly can include therein internal pre-formed openings for accommodating different infrastructure, such as plumbing, piping and electrical and/or communication wiring, and it can include the infrastructure itself, for example, when leaving the factory.

According to one aspect of the presently disclosed subject matter, there is provided a prefabricated construction wall assembly comprising: a frame structure having a first thermal expansion coefficient; and a panel configured for covering at least a majority of the a face of the frame structure, said panel having a second thermal expansion coefficient different from the first thermal expansion coefficient, and a solid-surface exterior face exposed to an exterior of the wall assembly and an interior face connected to the face of the frame structure so as to withstand the thermal structural differences between the frame structure and the exterior face.

The connection between the interior face and the frame structure can be provided in a directed manner at a plurality of connection areas. The thermal structural differences between the frame structure and the exterior face (or the entire panel) can result from various external factors, such as temperature related deformation changes (e.g., weather changes, air-conditioning, heating) at the vicinity (e.g., within or outside) of the building structure during day and night, and long term stability of the prefabricated construction wall assembly to withstand such changes is highly important. The thermal structural differences between the frame structure and the exterior face (or the entire panel) can result from expansion or contraction of the panel (or at least the exterior face), with respect to the frame structure.

According to a particular example, the thermal expansion coefficient of the panel can be greater than the expansion coefficient of the frame constriction. For example, when the frame structure is made of light gauge steel, its thermal expansion coefficient at 20° C. is between about $11 \times 10^{-6}$(° C.)$^{-1}$ and about $13 \times 10^{-6}$ (° C.)$^{-1}$, whereas, when the panel is made of Conan®, its thermal expansion coefficient at 20° C. is about $39 \times 10^{-6}$(° C.)$^{-1}$. According to another example, the thermal expansion coefficient of the panel can be lower than the expansion coefficient of the frame constriction.

The prefabricated construction wall assembly of this aspect can further comprise a plurality of mechanical adapters for providing the connection between the interior face of the panel and the frame structure in a direct manner so as to withstand the thermal expansion or contraction structural differences between the frame structure and the exterior face. According to an example of the presently disclosed subject matter there can be provided a plurality of mechanical adapters arranged as an array for directly connecting the frame structure and the interior face of the panel. The mechanical adapters can be equally spaced from each other at a predetermined distance. The mechanical adapters can have an elongate structure.

By connecting the interior face of the panel and the frame structure in a direct manner by an array of mechanical adapters, the prefabricated construction wall assembly would be able to withstand the thermal expansion or contraction structural differences between the frame structure and the exterior face. The mechanical adapters can have an elongate structure. This connection can further enable the prefabricated construction wall assembly to withstand structural deformation caused by earth displacements (land sink, earthquakes, etc.).

The panel can be made of a uniform material so that the thermal expansion coefficient of the exterior face and the interior face thereof is the same.

The prefabricated construction wall assembly of this aspect can further comprise at least one spacer having a first face configured for facing the frame structure and an opposite second face configured for facing the interior face of the panel. The spacer can be positioned and/or used for maintaining a predetermined distance between the interior face and the frame structure, e.g. for ensuring that the panel equally distant from the frame structure. The spacer can also be used to enable insertion of a buffer between the interior face and the frame structure, and the predetermined distance can therefore be set e.g. according to the thickness of the buffer.

The mechanical adapter can comprise a first end configured to be securely introduced into the frame structure a second end facing away from the first end and a body extending between the first end and the second end. The second end can have a circumcircle diameter which is greater than a circumcircle diameter of the body and a surface configured for mounting the interior face of the panel to the mechanical adapter. The mechanical adapter can further comprise a stopper, which can be disposed onto the body e.g. between the first end and the second end. In some embodiments of this aspect the stopper can also act as the spacer. The stopper can be configured for maintaining a predetermined distance between the interior face and the frame structure. Therefore, the stopper can have a circumcircle diameter which is greater than a circumcircle diameter of the first end. The surface of the second end of the mechanical adapter can define a cavity for receiving an adhesive therein. The cavity can have an incircle diameter which can be greater than or equal to the circumcircle diameter of the stopper.

The prefabricated construction wall assembly of this aspect can further comprise a buffer which can be positioned between the interior face and the frame structure, and the buffer can further be spaced along at least a majority of the panel. The buffer can be provided as a solid sheet, and can be configured to provide thermal and/or acoustic isolation. The buffer can be made, for example, of Extruded polystyrene (XPS), Expanded polystyrene (EPS), Closed-cell polyisocyanurate (PIR), Silica aerogel and any combination thereof. The buffer can be part of the interior face of the panel.

The frame structure can be structured from tracks and studs, for example, the tracks can provide horizontal support, e.g. by horizontal laid beams, and the studs can provide vertical support, e.g. by vertical laid beams. The frame structure can be configured to provide structural support and stability for basic load carrying of the building structure, according to construction engineering requirements. Constructing the frame structure from tracks and studs can create cavities within the frame structure. These cavities can be filled with butting isolating material, e.g. for ensuring that the panel is equally distant from the frame structure.

The entire panel can be formed out of a monolithic material. The entire panel can be made of the same material and can have the same characteristics as the exterior face.

The exterior face can comprise one or more of the following materials: an acrylic polymer, a Methyl methacrylate (MMA), an alumina trihydrate (ATH), a polyester, epoxy, composite materials, and any combination thereof.

The frame structure can be made of one or more of the following materials: metal, wood, plastic, composite materials, and any combination thereof. For example, the frame structure can be made of light gauge steel.

The prefabricated construction wall assembly of this aspect can further comprise a thermal conductive sheet, for example, a metal sheet, which can cover at least some portion of the interior side of the panel and directly adhered thereto. The thermal conductive sheet can comprise at least one tube configured for conveying thermal conductive fluid (e.g., water). The at least one tube can be positioned between the thermal conductive sheet and the interior side of the panel, wherein the at least one tube can be thermally coupled to the thermal conductive sheet for dispersing the temperature of the fluid along the panel. The thermal conductive fluid can be hot or cold water configured for heating the exterior face of the panel, and thereby the interior of the building structure.

The exterior face can be factory-finished.

According to another aspect of the presently disclosed subject matter there is provided a mechanical adapter configured for connecting an interior face of a panel to a frame structure, said mechanical adapter comprising: a first end configured to be securely introduced into said frame structure; a second end facing away from the first end and having a surface for mounting said interior face of the panel to said mechanical adapter; a body having a longitudinal axis extending between the first end and the second end; and a stopper configured to be disposed onto the body between said first end and said second end; wherein said stopper has a circumcircle diameter which is greater than a circumcircle diameter of the first end, configured for maintaining a predetermined distance between the second end and the frame structure.

The mechanical adapter of this aspect can be used with the prefabricated construction wall assembly of any one of the presently disclosed aspects for interconnecting a panel and a frame structure thereof. The mechanical adapter can provide structural support to the wall, on one hand by maintaining stable connection and distance between the panel and the frame structure, and on the other hand by providing some flexibility to withstand the thermal expansion or contraction structural differences between the frame structure and the panel.

The mechanical adapter of this aspect can be provided as one of many mechanical adapters forming an array of such mechanical adapters, as described above in connection with the previous aspect and any of the preceding aspects.

The stopper can be a spacer, having a first face adjacent to the frame structure and a second face spaced from and parallel to the first surface and configured to be adjacent to the second end of the mechanical adapter. The stopper can have a cylindrical shape.

The surface of the second end can comprise a cavity for receiving an adhesive therein. The cavity can have an incircle diameter which is greater than the circumcircle diameter of the stopper. The adhesive can be made of any know strong adhesive material such as: silicone, acrylic, ms-polymer, single or dual silicon, double sided adhesive tape, double component glue, epoxy, and any combination thereof.

The body of the mechanical adapter can be at least partially tilted so as to withstand the above described thermal structural differences between the frame structure and the exterior face. For example, the body can be at least partially tilted towards a direction which is lateral to the longitudinal axis of the body to withstand the thermal expansion or contraction structural differences between the frame structure and an exterior face of the panel.

The body can be threaded through a hole of the second end. The hole can be positioned at a center of the surface. The incircle diameter of the hole can be smaller than the incircle diameter of the cavity. The body of the mechanical adapter can be a screw, a rivet, a self-drilling screw, a wall plug, a nail and any combination thereof.

According to another aspect of the presently disclosed subject matter there is provided a prefabricated construction wall assembly comprising: a frame structure; a panel configured for covering at least a majority of a face of the frame structure, having a solid-surface exterior face, an interior face connected to the face of the frame structure and a panel wall extending therebetween and including an outermost panel edge at least partially lying in a panel reference plane which is perpendicular to the exterior face and to the interior face; and an intermediate member spaced along at least a majority of the panel, having a first side facing the frame structure, a second side facing the panel and a side wall extending therebetween, said side wall being at least partially spaced from the panel reference plane by a back gap; at least a portion of said panel including said panel edge being bendable into at least some of said back gap which is free of a non-elastic material.

The term 'non-elastic material' refers to any rigid material that can prevent the portion of the panel edge to be bent into the back gap upon application of a reasonable pressure force thereon by an adjacent panel edge as a result of thermal explanation of the panel of said adjacent panel edge.

The exterior face can be factory-finished.

The prefabricated construction wall assembly of this aspect is configured to enable two prefabricated construction wall assemblies to be constructed adjacent to each other to form a corner of the building structure, so that a panel edge of one wall assembly is positioned very close, even without any reveals from an exterior face of the bendable portion of the other wall assembly. In this configuration, thermal expansion of the panel including the panel edge of the one wall assembly, e.g. due to temperature variations, would cause this panel edge to apply pressure onto the portion of the other wall assembly, which in turn would be bent into the back gap of the other wall assembly. In other words, the back gap provides space for the bendable portion upon thermal expansion of the panel of the one wall assembly.

The intermediate member can be a buffer, and the side wall thereof can comprise a first portion and a second portion shifted with respect to the first portion along a third portion so that the first portion is closer to the panel reference plain than the second portion. The back gap can therefore be defined by the second and third portions of the side wall and a portion of the interior face, and can extend along the length of the panel edge. The first portion and second portion can be parallel to the panel reference plane. Alternatively, the third portion can be positioned with respect to the interior face at an angle different from 180°.

The back gap can extend along the length of the panel edge. The back gap can be free of any material.

The frame structure can have a first face, a second face constituting the face and a frame wall extending therebetween and including an outermost frame edge at least partially lying in a frame reference plane which is perpendicular to the first face and to the second face. The panel edge can face the frame reference plane, such that the panel edge is spaced from the frame reference plane thereby creating a side gap. At least a portion of the panel including the panel edge can be expandable towards the frame reference plane, so that at least the panel edge can be displaced into at least some of the side gap which can be free of a non-elastic material.

The wall assembly according to this aspect can further comprise a flange, which can be adjacent to or being part of the frame structure. The flange can be disposed along the back gap, e.g. between the interior face and the frame structure, thereby forming an air duct, which can be configured for facilitating flow of air therethough.

The wall assembly can further comprise a plurality of mechanical adapters for providing the connection between the interior face of the panel and the frame structure, e.g. in a direct manner. The mechanical adapters can have an elongate structure. The mechanical adapter can comprise a first end configured to be securely introduced into the frame structure, a second end facing away from the first end and a body extending between the first end and the second end. The second end can have a surface for mounting the interior face of the panel to the mechanical adapter, and an incircle diameter which can be greater than a circumcircle diameter of the body.

The wall assembly can further comprise a stopper, which can be disposed onto the body, e.g. between the first end and the second end. The stopper can have a circumcircle diameter which can be greater than a circumcircle diameter of the first end, and can be configured for maintaining a predetermined distance between the interior face and the frame structure. The second end of the mechanical adapter can comprise a cavity for receiving an adhesive therein. The cavity can have an incircle diameter which can be greater than or equal to the circumcircle diameter of the stopper.

The exterior face of the wall assembly can comprise one or more of the following materials: an acrylic polymer, a Methyl methacrylate (MMA), an alumina trihydrate (ATH), a polyester, epoxy composite materials, and any combination thereof.

According to another aspect of the presently disclosed subject matter there is provided a prefabricated construction wall assembly comprising: a frame structure having a first face, a second face and a frame wall extending therebetween and including an outermost frame edge at least partially lying in a frame reference plane which is perpendicular to the first face and to the second face; and a panel configured for covering at least a majority of the second face of the frame structure, having a solid-surface exterior face, an interior face connected to the second face of the frame structure and a panel wall extending therebetween and including an outermost panel edge facing the frame reference plane, said panel edge being spaced from the frame reference plane thereby creating a side gap; said panel being expandable towards the frame reference plane, so that at least the panel edge being displaced into at least some of said side gap.

The prefabricated construction wall assembly of this aspect is configured to enable two prefabricated construction wall assemblies to be constructed adjacent to each other to form a corner of the building structure. The panel edge of one wall assembly can be positioned very close to an exterior face of the panel of the other wall assembly, such that a side gap is maintained therebetween. In a particular example, the frame structure of the wall assembly is directly connected to the frame structure of the other wall assembly, forming together the corner. According to this example, the side gap is sized so at to receive the thickness of the other wall assembly, and the side gap still has enough space left between the panel edge of the wall assembly and the exterior face of the panel of the other wall assembly to enable the expansion of the panel of the wall assembly. The space formed between the panel edge of the wall assembly and the exterior face of the panel of the other wall assembly to enable the expansion of the panel of the wall assembly can be defined as a corner reveal gap. The corner reveal gap is the part of the side gap, and has smaller dimensions than the side gap. The side gap thus can be greater than a wall assembly thickness, which is defined as a distance between an exterior face of a panel and a first face of a frame of another wall assembly a side of which can be configured to be received therein. The second face of the frame structure can thus comprise a sub portion, facing the side gap, which can be configured for being mounted to a frame structure of the other wall assembly, so as to accommodate its thickness.

In this configuration, thermal expansion of the panel including the panel edge of the one wall assembly, e.g. due to temperature variations, would cause the panel to expand so that its panel edge is displaced towards panel of the other wall assembly. Due to the side gap, the expansion of the panel would not cause the panel edge to apply pressure onto the panel of the other wall assembly. In other words, the side gap provides space for the expanded portion of the panel due to the thermal expansion thereof.

The frame structure can have a first thermal expansion coefficient, and the panel can have a second thermal coefficient, which is greater or smaller than the first thermal coefficient. This feature can cause the panel to have greater expansion or smaller contraction reaction to temperature variations with respect to the frame structure, and the side gap is configured to provide space to the expanded portion upon the expansion.

The side gap can be free of a non-elastic material. The term 'non-elastic material' refers to any rigid material that can prevent the portion of the panel edge to be displaced into the side gap as a result of thermal explanation of the panel.

The wall assembly according to this aspect can comprise an intermediate member which is spaced along at least a majority of the frame structure. The intermediate member can have a first side facing the frame structure, a second side facing the panel and a side wall extending therebetween. The intermediate member can be any member disposed between the panel and the frame structure, for example a buffer and/or one or more spacers.

The wall assembly according to this aspect, wherein the panel can have a panel distance which can be defined as a distance between the panel edge and an opposite outermost second panel edge. The frame structure can have a frame distance which can be defined as a distance between the frame edge and an opposite outermost second frame edge, the panel distance can be shorter than to the frame distance.

The wall assembly according to this aspect can further comprise a plate connecting mechanism, which can be configured for connecting a detachably attachable plate along the panel edge within the side gap.

The plate connecting mechanism can comprise at least one magnet or at least one metal plate having ferromagnetic characteristics. The magnet or the ferromagnetic plate can be configured for detachably attaching the plate, e.g. within the side gap. The plate connecting mechanism can comprise at least one mounting member, which can have a first portion pivotally connectable to the wall assembly. The first portion can be pivotally connected to any one of the following parts of the wall assembly: the frame structure, the panel, the intermediate member, and any combination thereof. The mounting member can further have a second portion configured for connecting the plate, e.g. with the at least one magnet or at least one metal plate having ferromagnetic characteristics configured for detachably attaching the plate. The assembly can further comprise the detachably attachable plate, which can have a solid-surface exterior face, e g similar to the exterior face of the panel, and an interior face. The interior face of the plate can include a magnet or a metal plate having ferromagnetic characteristics, such that the plate can be configured to be detachably attached to the metal plate or to at least one magnet of the plate connecting mechanism, thereby securing the plate within the side gap. The plate and the mechanical adapter can be slightly displaced with respect to each other. Having contact surfaces with different surface areas can enable better connection between the two surface areas, e.g. even when the metal plate may not be aligned with the at least one magnet they will still have at least some common surface are which can enable them to connect to each other. In addition, the use of magnets can enable overcoming small distance in-accuracies, e.g. since the force of the at least one magnet can attract the metal plate from a distance, the plate can still be connected to the connecting mechanism even if not all magnet surfaces are in direct contact with the metal plate. In addition, when the interior face of the plate is connected to the connecting mechanism the exterior face of the plate can be coplanar with the exterior face of the panel. In order of the plate to blend in within the side gap without standing out, the solid-surface exterior face of the plate can be made from the same material as the solid-surface exterior face of the panel.

The wall assembly according to this aspect can further comprise a plurality of mechanical adapters for providing connection of the interior face of the panel to the frame structure, e.g. in a direct manner. The mechanical adapters can have an elongate structure. The mechanical adapter can comprise a first end, a second end and a body extending between the first end and the second end. The first end can be configured to be securely introduced into the frame structure. The second end, facing away from the first end, can have a surface which can be configured for mounting the interior face of the panel to the mechanical adapter. The second end can have an incircle diameter which can be greater than or equal to a circumcircle diameter of the body. The mechanical adapter can further comprise a stopper, which can be disposed onto the body, e.g. between the first end and the second end. The stopper can have a circumcircle diameter which can be greater than or equal to a circumcircle diameter of the first end. The stopper can be configured for maintaining a predetermined distance between the interior face and the frame structure. Since the surface of the second end can be configured for mounting the interior face of the panel to the mechanical adapter it can therefore comprise a cavity for receiving an adhesive therein. The cavity can have a circumcircle diameter which can be greater than or equal to the circumcircle diameter of the stopper.

In the example in which the intermediate member is a buffer, the buffer can be spaced along at least a majority of the panel and can have a first buffer side facing the frame structure, a second buffer side facing the panel and a buffer wall extending therebetween facing the frame reference plane. The buffer can have a buffer distance, which may be defined as a distance between the buffer wall and an opposite second buffer wall. The panel can have a panel distance which can be defined as a distance between the panel edge and an opposite outermost second panel edge. The buffer distance can be shorter than or equal to the panel distance.

The wall assembly according to this aspect can further comprise a detachably attachable plate having a solid-surface exterior face and an interior face comprises at least one magnet or a metal plate having ferromagnetic characteristics, configured to be detachably attached to the frame structure. For example, detachably attachable plate can be connected to the frame structure within the side gap, without the need for a connecting mechanism. For example, by using a magnet to attach the detachably attachable plate to a meatal beam of the frame structure.

The exterior face can be factory-finished.

The wall assembly according to this aspect, wherein the exterior face comprise one or more of the following materials: an acrylic polymer, a Methyl methacrylate (MMA), an alumina trihydrate (ATH), a polyester, epoxy, composite materials, and any combination thereof.

According to another aspect of the presently disclosed subject matter there is provided a set of a first prefabricated construction wall and a second prefabricated construction wall forming together a corner, each of said first and second prefabricated construction walls comprising: a frame structure having a first face, a second face and a frame wall extending therebetween; and a panel configured for covering at least a majority of the second face of the frame structure, having a solid-surface exterior face, an interior face connected to the second face of the frame structure and a panel wall extending therebetween, said frame structure of the first prefabricated construction wall is connected directly or indirectly to said frame structure of the second prefabricated construction wall at said corner at an angle smaller than 180°, so that said panel wall of said first prefabricated construction wall faces the frame structure of the second prefabricated construction wall and is spaced from the panel of said second prefabricated construction wall by a corner reveal gap.

According to this aspect, the set of two prefabricated construction wall assemblies is such that when the prefabricated construction wall assemblies are connected to each other, the corner reveal gap is formed therebetween. The corner reveal gap is configured to ensure that there is sufficient space for a panel wall of at least one of the panels which expands due to temperature related deformation changes. During this expansion, the dimension of the corner reveal gap would decrease, however, it can be large enough to ensure that the expanded panel will not apply pressure onto the other panel of the adjacent second wall assembly.

Each frame structure of the first and second prefabricated construction walls can have a first thermal expansion coefficient which can be different, e.g. smaller, than a second thermal expansion coefficient of each panel of the first and second prefabricated construction walls. The angle at which the first prefabricated construction wall can be connected, e.g. directly and/or indirectly, to the frame structure of the second prefabricated construction wall at the corner can be defined between the second faces of the first and second prefabricated construction walls, and can be about 90° or smaller.

In the set according this aspect, the panel wall of the first prefabricated construction wall can face the exterior face of the panel of the second prefabricated construction wall.

In the set according this aspect, the corner reveal gap can be configured to enable expansion of the panel and displacement of the respective panel wall of the first prefabricated construction wall into the corner reveal gap, thereby reducing a dimension of the corner reveal gap. Nonetheless, even upon the expansion, the dimension of corner reveal gap is greater than zero, thereby preventing the expanded panel from applying pressure onto the other panel. Therefore the corner reveal gap can be free of a non-elastic material.

In the set according this aspect, the frame wall of the first prefabricated construction wall can include an outermost frame edge at least partially lying in a first frame reference plane which is perpendicular to the first face and to the second face of the first prefabricated construction wall. The panel wall of the first prefabricated construction wall can be spaced from the first frame reference plane thereby creating a side gap. The panel of the first prefabricated construction wall can be expandable, e.g. towards the first frame reference plane. The side gap can be greater than a thickness of the second prefabricated construction wall, and can be defined as a distance between the exterior face and the first face of the panel of the second prefabricated construction wall. The connection between the frame structure of the first prefabricated construction wall and the frame structure of the second prefabricated construction wall can be provided at the side gap. Therefore, the side gap can include and can be greater than the corner reveal gap.

In the set according this aspect, each of the first and second prefabricated construction walls can further comprise an intermediate member, which can be spaced along at least a majority of the second face of the respective frame structure. The intermediate member can have a first side facing the frame structure and a second side facing the panel. The intermediate member can be any member disposed between the panel and the frame structure, for example a buffer and/or one or more spacers.

The exterior face can be factory-finished.

According to another aspect of the presently disclosed subject matter there is provided a plate connecting mechanism configured for connecting a detachably attachable plate along a panel edge of a panel of a wall, said plate connecting mechanism comprising: at least one mounting member having a first portion adjustably connectable to one of said wall and said detachably attachable plate, and a second portion; and at least one magnet or metal plate connected to said second portion and configured for detachably attaching said second portion to another one of said wall and said detachably attachable plate.

The detachably attachable plate can be any one of: a baseboard, a skirting board, a skirting, a mopboard, a floor molding, and a base molding, configured for covering a side gap of an interior wall. The detachability of the plate allows convenient approach to the interior space of the wall, for example, for installation and maintenance of wiring and piping inside the interior space. Additionally, the detachably attachable plate can enable an installation of a parquet, which can be extended to the frame structure. When attaching the detachably attachable plate, the plate hides the edges of the parquet so as it is not visible.

For example, the connecting mechanism along with the plate can be used for covering an exposed section (e.g., a side gap) of a prefabricated construction wall assembly. The connecting mechanism can be used with the prefabricated construction wall assemblies of any one of the above aspects, but is not limited thereto.

According to this aspect of the presently disclosed subject matter, the connecting mechanism can further comprise a pivot mechanism configured for pivotally connecting the first portion to the one of the wall and the detachably attachable plate. The pivot mechanism can be configured for fixing the mounting member at a plurality of angles. This ability of the pivot mechanism can allow controlling the distance between the mounting member and other parts (e.g., a panel edge) of the wall. Alternatively, or additionally, the connecting mechanism can comprise a sliding mechanism for controlling the distance between the mounting member and other parts (e.g., a panel edge) of the wall.

The connection of the at least one magnet or metal plate to the second portion can be adjustable along the second portion.

A connecting surface of the at least one magnet or metal plate can cover at least a majority of the at least one mounting member.

The plate connecting mechanism according this aspect can further comprise the detachably attachable plate having a solid-surface exterior face and an interior face. The interior face can be configured to be mounted to the first portion member or can comprise at least one magnet and/or at least one metal plate having ferromagnetic characteristics. The at least one magnet and/or metal plate can be configured to be detachably attached to the at least one magnet and/or metal plate of the connecting mechanism, respectively, for example, to the second portion.

A contact surface area of said metal plate can be greater than or equal to a contact surface area of said at least one magnet and vice versa. Due to this feature, the position of the plate with respect to the connecting mechanism (and with respect to the wall) can be easily adjusted in accordance with various requirements, such as a non-uniform shape or angle of the plate with respect to the wall. In addition, when a number of plate connecting mechanisms are used for attaching a single plate, the use of the magnetic manner of connection can compensate as situation in which not all the magnets are in direct contact with their respect metal plate.

When the interior face of the plate is connected to the connecting mechanism, the exterior face of the plate can be coplanar with an exterior face of the panel of the wall.

The solid-surface exterior face of the plate can be made from the same material as a solid-surface exterior face of the panel.

The plate connecting mechanism according this aspect, wherein the solid-surface exterior face or said plate comprises one or more of the following materials: an acrylic polymer, a Methyl methacrylate (MMA), an alumina trihydrate (ATH), a polyester, epoxy, composite materials, and any combination thereof.

The exterior face of the plate can be factory-finished.

According to another aspect of the presently disclosed subject matter there is provided a prefabricated construction wall assembly comprising: a frame structure; and a panel configured for covering at least a majority of a side face of the frame structure, having a solid-surface exterior face, an interior face connected to the frame structure and a panel wall extending therebetween and including an outermost panel edge at least partially lying in a panel reference plane which is perpendicular to the exterior face and to the interior face; a buffer spaced along at least a majority of the panel, having a first side facing the frame structure, a second side facing the panel and a side wall extending therebetween, said side wall forming a duct portion being spaced from the panel reference plane by a duct gap; and a flange adjacent to or being part of the frame structure and being disposed at least along the duct gap and at least along an interior portion of said interior face facing the duct gap, for facilitating flow of air through the duct gap.

The prefabricated construction wall assembly of this aspect can be used for enabling air flow into and/or out from an interior of building structure (e.g., a room). This air flow can be required as part of local regulations at different places around the world for providing proper air ventilation of the building structure. The structure of the prefabricated construction wall assembly according to this aspect, allows exploiting the structure and the shape of its buffer to be used a duct for conveying the air into the interior of the building structure. Thus, using the duct gap for conveying the air therethrough, can eliminate using specially provided piping usually used for the above purpose and specially formed openings for this purpose.

According to this aspect, the panel can have an air inlet extending between the solid-surface exterior face and said interior portion for providing fluid communication between an air source and the duct gap.

The frame structure can have a first face, a second face and an frame wall extending therebetween. The frame wall including an outermost frame edge can be at least partially lying in a frame reference plane which is perpendicular to the first face and to the second face. Furthermore, the panel edge can face the frame reference plane, and can be spaced from the frame reference plane thereby creating a side gap, which can be configured for facilitating the flow of the air from the duct gap therethrough.

The wall assembly according this aspect can further comprise a plurality of mechanical adapters for providing the connection of the interior face of the panel to the frame structure in a direct manner. The mechanical adapters can have an elongate structure. The mechanical adapter can comprise a first end, a second end and a body extending between the first end and the second end. The first end can be configured to be securely introduced into the frame structure. The second end can be facing away from the first end and can have a cavity, e.g. for receiving an adhesive therein, for mounting the interior face of the panel to the mechanical adapter. The second end can have an incircle diameter which can be greater than or equal to a circumcircle diameter of the body. The mechanical adapter can further comprise a spacer, which can be configured to be disposed onto the body between the first end and the second end. The spacer can have a circumcircle diameter which can be greater than or equal to a circumcircle diameter of the first end, wherever the second end of the mechanical adapter can have an incircle diameter which can be greater than or equal to the circumcircle diameter of the spacer. The spacer can be configured for maintaining a predetermined distance between the interior face and the frame structure.

The wall assembly according this aspect, wherein the duct portion, spaced from the panel reference plane by a duct gap, can comprise a first sub-portion, a third sub-portion facing the first sub-portion and a second sub-portion extending therebetween and facing the panel reference plane. The first sub-portion and said third sub-portion can be closer to the panel reference plain than said second sub-portion. Furthermore, the first sub-portion can be parallel to the third sub-portion, and both the first sub-portion and the third sub-portion can be perpendicular to the second sub-portion. The second sub-portion can be parallel to the panel reference plane.

The wall assembly according this aspect, wherein the exterior face of the panel can be configured to be connected to a ceiling member. The ceiling member can dive the exterior face of the panel into an upper portion, which can be positioned above the ceiling member, and a bottom portion, which can be positioned beneath the ceiling member. The air inlet and/or outlet can be disposed at the upper portion of the exterior face. When connected to the exterior face of the panel, the ceiling member can be perpendicular to the exterior face of the panel.

The wall assembly according this aspect, wherein the solid-surface exterior face comprises one or more of the following materials: an acrylic polymer, a Methyl methacrylate (MMA), an alumina trihydrate (ATH), a polyester, epoxy, composite materials, and any combination thereof.

The exterior face can be factory-finished.

Any one of the side gap, the back gap and the corner revel gap according to any one of the respective aspects in which they are mentioned, can at least partially accommodate any known in the art elastic material. Such an elastic material can be deformable by a respective portion of the panel, resulting from thermal deformation of the panel or any other external pressure applied on the elastic material.

The above general description has been provided so that the nature of the disclosed subject matter can be generally understood without being limited to specific embodiments and examples. A more specific description is provided in the Detailed Description whilst the following are non-limiting examples of different embodiments of the presently disclosed subject matter:

1) A prefabricated construction wall assembly comprising:
   a frame structure having a first thermal expansion coefficient; and
   a panel configured for covering at least a majority of the a face of the frame structure, said panel having a second thermal expansion coefficient different from the first thermal expansion coefficient, and a solid-surface exterior face exposed to an exterior of the wall assembly and an interior face connected to the face of the frame structure so as to withstand the thermal structural differences between the frame structure and the exterior face.

2) The wall assembly according to Embodiment 1, further comprising at least one spacer having a first face configured for facing the frame structure and an opposite second face configured for facing the interior face of the panel for maintaining a predetermined distance between the interior face and the frame structure.

3) The wall assembly according to any one of the preceding embodiments, further comprising a first buffer positioned between the interior face and the frame structure spaced along at least a majority of the panel.

4) The wall assembly according to any one of the preceding embodiments, wherein said frame structure is structured from tracks and studs.

5) The wall assembly according to Embodiment 4, further comprising a butting isolating material positioned within cavities formed between said tracks and/or studs.

6) The wall assembly according any one of the preceding embodiments, further comprising a plurality of mechanical adapters for providing said connection of the interior face of the panel to the frame structure in a direct manner 7) The wall assembly according to Embodiment 6, wherein said mechanical adapter comprises:
   a first end configured to be securely introduced into the frame structure;
   a second end facing away from the first end and having a surface for mounting the interior face of the panel to said mechanical adapter; and
   a body extending between the first end and the second end;
   wherein said second end having a circumcircle diameter which is greater than a circumcircle diameter of the body.

8) The wall assembly according to Embodiment 7, further comprising a stopper disposed onto said body between the first end and the second end, and having a circumcircle diameter which is greater than a circumcircle diameter of the first end, and configured for maintaining a predetermined distance between the interior face and the frame structure.

9) The mechanical adapter according to Embodiment 7 or 8, wherein said surface of the second end defines a cavity for receiving an adhesive therein, and said cavity has an incircle diameter which is greater than or equal to the circumcircle diameter of the stopper.

10) The wall assembly according to Embodiment 8, when dependent on Embodiment 2, wherein said stopper is said spacer.

11) The wall assembly according to any one of the preceding embodiments, wherein the exterior face comprises one or more of the following materials: an acrylic polymer, a Methyl methacrylate (MMA), an alumina trihydrate (ATH), a polyester, epoxy, composite materials, and any combination thereof.

12) The wall assembly according to any one of the preceding embodiments, wherein said frame structure is made of one or more of the following materials: metal, wood, plastic, composite materials, and any combination thereof.

13) The wall assembly according to any one of the preceding embodiments, further comprising a thermal conductive sheet which covers at least some portion of the interior side of the panel and is adhered thereto.

14) The wall assembly of embodiment 13, further comprising at least one tube configured for conveying thermal conductive fluid, said at least one tube is positioned between the thermal conductive sheet and the interior side of the panel, wherein said at least one tube is thermally coupled to the thermal conductive sheet which is configured for dispersing heat.

15) The wall assembly according to any one of the preceding embodiments, wherein the thermal expansion coefficient of the panel is greater than the expansion coefficient of the frame constriction.

16) The wall assembly according to any one of the preceding embodiments, wherein the exterior face is factory-finished.

17) A mechanical adapter configured for connecting an interior face of a panel to a frame structure, said mechanical adapter comprising:
   a first end configured to be securely introduced into said frame structure;
   a second end facing away from the first end and having a surface for mounting said interior face of the panel to said mechanical adapter;
   a body having a longitudinal axis extending between the first end and the second end; and
   a stopper configured to be disposed onto the body between said first end and said second end;

wherein said stopper has a circumcircle diameter which is greater than a circumcircle diameter of the first end, configured for maintaining a predetermined distance between the second end and the frame structure.

18) The mechanical adapter according to Embodiment 17, wherein said stopper is a spacer having a first face adjacent to the frame structure and a second face spaced from and parallel to the first surface and configured to be adjacent to the second end of the mechanical adapter.

19) The mechanical adapter according to any one of Embodiments 17 to 18, wherein said surface of the second end comprises a cavity for receiving an adhesive therein, having an incircle diameter which is greater than the circumcircle diameter of the stopper.

20) The mechanical adapter according to any one of Embodiments 17 to 19, wherein the stopper has a cylindrical shape.

21) The mechanical adapter according to any one of Embodiments 17 to 20, wherein said body is at least partially tilted towards a direction which is lateral to the longitudinal axis of the body to withstand thermal expansion or contraction differences between the frame structure and an exterior face of the panel.

22) The mechanical adapter according to any one of Embodiments 17 to 21, wherein said body is a screw, a rivet, a self-drilling screw, and any combination thereof.

23) The mechanical adapter according to any one of Embodiments 17 to 22, wherein said body is threaded through a hole of the second end.

24) The mechanical adapter according to Embodiment 23, wherein said hole is positioned at a center of the surface.

25) The mechanical adapter according to Embodiment 24, wherein said incircle diameter of the hole is smaller than the incircle diameter of the cavity.

26) A prefabricated construction wall assembly comprising:
a frame structure;
a panel configured for covering at least a majority of a face of the frame structure, having a solid-surface exterior face, an interior face connected to the face of the frame structure and a panel wall extending therebetween and including an outermost panel edge at least partially lying in a panel reference plane which is perpendicular to the exterior face and to the interior face; and
an intermediate member spaced along at least a majority of the panel, having a first side facing the frame structure, a second side facing the panel and a side wall extending therebetween, said side wall being at least partially spaced from the panel reference plane by a back gap;
at least a portion of said panel including said panel edge being bendable into at least some of said back gap which is free of a non-elastic material.

27) The wall assembly according to Embodiment 26, wherein said intermediate member is a buffer or one or more spacers.

28) The wall assembly according to Embodiment 27, wherein said side wall of the buffer comprises a first portion and a second portion shifted with respect to the first portion along a third portion so that the first portion is closer to the panel reference plain than the second portion, and the back gap being defined by the second and third portions of the side wall and a portion of the interior face.

29) The wall assembly according to Embodiment 28, wherein said first portion and second portion are parallel to the panel reference plane.

30) The wall assembly according to Embodiment 28 or 29, wherein said third portion is parallel to the interior face.

31) The wall assembly according to Embodiment 28 or 29, wherein said third portion is positioned with respect to the interior face at an angle different from 180°.

32) The wall assembly according to any one of Embodiments 26 to 31, wherein said back gap extends along the length of the panel edge.

33) The wall assembly according to any one of Embodiments 26 to 32, wherein the back gap is free of any material.

34) The wall assembly according to any one of the Embodiments 26 to 33, wherein said frame structure having a first face, a second face constituting said face and a frame wall extending therebetween and including an outermost frame edge at least partially lying in a frame reference plane which is perpendicular to the first face and to the second face; and wherein said panel edge faces the frame reference plane, such that said panel edge is spaced from the frame reference plane thereby creating a side gap; at least a portion of said panel including said panel edge being expandable towards the frame reference plane, so that at least the panel edge being displaced into at least some of said side gap which is free of a non-elastic material.

35) The wall assembly of Embodiment 26, further comprising a flange adjacent to or being part of the frame structure and being disposed along the back gap between the interior face and the frame structure thereby forming an air duct configured for facilitating flow of air therethough.

36) The wall assembly according any one of Embodiments 26 to 35, further comprising a plurality of mechanical adapters for providing said connection of the interior face of the panel to the frame structure in a direct manner 37) The wall assembly according to Embodiment 36, wherein said mechanical adapter comprises:
a first end configured to be securely introduced into the frame structure;
a second end facing away from the first end and having a surface for mounting the interior face of the panel to said mechanical adapter; and
a body extending between the first end and the second end;
wherein said second end having an incircle diameter which is greater than a circumcircle diameter of the body.

38) The wall assembly according to Embodiment 37 further comprising a stopper disposed onto said body between the first end and the second end, and having a circumcircle diameter which is greater than a circumcircle diameter of the first end, and configured for maintaining a predetermined distance between the interior face and the frame structure.

39) The mechanical adapter according to Embodiment 36 or 37, wherein said surface of the second end comprises a cavity for receiving an adhesive therein, having an incircle diameter which is greater than or equal to the circumcircle diameter of the stopper.

40) The wall assembly according to any one of Embodiments 26 to 39, wherein the exterior face comprises one or more of the following materials: an acrylic polymer, a Methyl methacrylate (MMA), an alumina trihydrate (ATH), a polyester, epoxy, composite materials, and any combination thereof.
41) The wall assembly according to any one of Embodiments 26 to 40, wherein the exterior face is factory-finished.
42) A prefabricated construction wall assembly comprising:
a frame structure having a first face, a second face and a frame wall extending therebetween and including an outermost frame edge at least partially lying in a frame reference plane which is perpendicular to the first face and to the second face; and
a panel configured for covering at least a majority of the second face of the frame structure, having a solid-surface exterior face, an interior face connected to the second face of the frame structure and a panel wall extending therebetween and including an outermost panel edge facing the frame reference plane, said panel edge being spaced from the frame reference plane thereby creating a side gap;
said panel being expandable towards the frame reference plane, so that at least the panel edge being displaced into at least some of said side gap.
42) The wall assembly of Embodiment 41, further comprising an intermediate member spaced along at least a majority of the frame structure, having a first side facing the frame structure, a second side facing the panel and a side wall extending therebetween.
43) The wall assembly of Embodiment 42, wherein said intermediate member is a buffer or one or more spacers.
44) The wall assembly according to any one of Embodiments 41 to 43, wherein said panel has a panel distance defined as a distance between said panel edge and an opposite outermost second panel edge, and said frame structure has a frame distance defined as a distance between said frame edge and an opposite outermost second frame edge, said panel distance is shorter than to the frame distance.
45) The wall assembly according to any one of Embodiments 41 to 44, further comprising a plate connecting mechanism configured for connecting a detachably attachable plate along said panel edge within said side gap.
46) The wall assembly according to Embodiment 45, wherein said plate connecting mechanism comprises at least one mounting member configured for detachably attaching said plate.
47) The wall assembly according to Embodiment 46, wherein said at least one mounting member having a first portion pivotally connectable to the wall assembly and a second portion configured for connecting the plate.
48) The wall assembly according to any one of Embodiments 45 to 47, further comprising at least one magnet or at least one metal plate having ferromagnetic characteristics configured for detachably attaching said plate
49) The wall assembly according to any one of Embodiments 45 to 48, further comprising said detachably attachable plate having a solid-surface exterior face and an interior face configured for being detachably attached to said mounting member.
50) The wall assembly according to Embodiments 49, wherein said interior face further comprises a magnet or a metal plate having ferromagnetic characteristics, configured to be detachably attached to the metal plate or to at least one magnet of the connecting mechanism.
51) The wall assembly according to Embodiment 50, wherein a contact surface of said metal plate is greater than a contact surface of said at least one magnet.
52) The wall assembly according to Embodiment 50, wherein a contact surface of said at least one magnet is greater than a contact surface of said metal plate.
53) The wall assembly according to Embodiments 50 to 52, wherein when the interior face of the plate is connected to the connecting mechanism said exterior face of the plate is coplanar with said exterior face of the panel.
54) The wall assembly according to Embodiments 50 to 53, wherein said solid-surface exterior face of said plate is made from the same material as said solid-surface exterior face of the panel.
55) The wall assembly according any one of Embodiments 41 to 54, further comprising a plurality of mechanical adapters for providing said connection of the interior face of the panel to the frame structure in a direct manner
56) The wall assembly according to Embodiment 55, wherein said mechanical adapter comprises:
a first end configured to be securely introduced into the frame structure;
a second end facing away from the first end and having a surface for mounting the interior face of the panel to said mechanical adapter; and
a body extending between the first end and the second end.
57) The wall assembly according to Embodiment 56, wherein said second end having a incircle diameter which is greater than a circumcircle diameter of the body.
58) The wall assembly according to Embodiment 56 or 57, further comprising a stopper disposed onto said body between the first end and the second end, and having a circumcircle diameter which is greater than a circumcircle diameter of the first end, and configured for maintaining a predetermined distance between the interior face and the frame structure.
59) The mechanical adapter according to Embodiment 56 to 58, wherein said surface of the second end comprises a cavity for receiving an adhesive therein.
60) The mechanical adapter according to Embodiment 59, wherein said cavity has a circumcircle diameter which is greater than or equal to the circumcircle diameter of the stopper.
61) The wall assembly according to any one of Embodiments 41 to 60, when dependent on Embodiment 44, wherein said buffer is spaced along at least a majority of the panel, having a first buffer side facing the frame structure, a second buffer side facing the panel and a buffer wall extending therebetween facing the frame reference plane, said buffer has a buffer distance defined as a distance between said buffer wall and an opposite second buffer wall, and said panel has a panel distance defined as a distance between said panel edge and an opposite outermost second panel edge, said buffer distance is shorter than the panel distance.
62) The wall assembly according to any one of Embodiments 41 to 61, wherein said side gap is greater than a wall assembly thickness defined as a distance between an exterior face of a panel and a first face of a frame of another wall assembly a side of which is configured to be received therein.
63) The wall assembly according to any one of Embodiments 41 to 62, wherein said second face of the frame structure comprises a sub portion facing the side gap and configured for being mounted to a frame structure of another prefabricated construction wall assembly.
64) The wall assembly according to any one of Embodiments 41 to 63, wherein the exterior face comprises one or more of the following materials: an acrylic polymer, a Methyl methacrylate (MMA), an alumina trihydrate (ATH), a polyester, epoxy, composite materials, and any combination thereof.
65) The wall assembly according to any one of Embodiments 41 to 64, wherein said side gap is free of a non-elastic material or any material.
66) The wall assembly according to any one of Embodiments 41 to 65, wherein the exterior face is factory-finished.
67) The wall assembly according to any one of Embodiments 41 to 66, further comprising a detachably attachable plate having a solid-surface exterior face and an interior face comprises at least one magnet or a metal plate having ferromagnetic characteristics, configured to be detachably attached to the frame structure.
68) A set of a first prefabricated construction wall and a second prefabricated construction wall forming together a corner,
each of said first and second prefabricated construction walls comprising:
a frame structure having a first face, a second face and a frame wall extending therebetween; and
a panel configured for covering at least a majority of the second face of the frame structure, having a solid-surface exterior face, an interior face connected to the second face of the frame structure and a panel wall extending therebetween,
said frame structure of the first prefabricated construction wall is connected directly or indirectly to said frame structure of the second prefabricated construction wall at said corner at an angle smaller than 180°, so that said panel wall of said first prefabricated construction wall faces the frame structure of the second prefabricated construction wall and is spaced from the panel of said second prefabricated construction wall by a corner reveal gap.
69) The set according to Embodiment 68, wherein each frame structure of said first and second prefabricated construction walls has a first thermal expansion coefficient which is different than a second thermal expansion coefficient of each panel of said first and second prefabricated construction walls.
70) The set according to Embodiment 68 or 69, wherein said angel is defined between the second faces of the first and second prefabricated construction walls.
71) The set according to Embodiment 70, wherein said angle is about 90°.
72) The set according to any one of the Embodiments 68 to 71, wherein said panel wall of said first prefabricated construction wall faces the exterior face of the panel of the second prefabricated construction wall.
73) The set according to any one of Embodiments 68 to 72, wherein said corner reveal gap is configured to enable expansion of the panel and displacement of the respective panel wall of the first prefabricated construction wall into said corner reveal gap, thereby reducing a dimension of the corner reveal gap.
74) The set according to Embodiment 73, wherein upon said expansion, the dimension of corner reveal gap is greater than zero.
75) The set according to any one of Embodiments 68 to 74, wherein the frame wall of the first prefabricated construction wall includes an outermost frame edge at least partially lying in a first frame reference plane which is perpendicular to the first face and to the second face of the first prefabricated construction wall; and wherein the panel wall of the first prefabricated construction wall is spaced from the first frame reference plane thereby creating a side gap and the panel of the first prefabricated construction wall is expandable towards the first frame reference plane; and wherein the side gap is greater than a thickness of the second prefabricated construction wall defined as a distance between the exterior face and the first face of the panel of the second prefabricated construction wall.
76) The set according to Embodiment 75, wherein the connection between the frame structure of the first prefabricated construction wall and the frame structure of the second prefabricated construction wall is provided at said side gap.
77) The set according to any one of Embodiments 68 to 75, wherein said corner reveal gap is free of a non-elastic material.
78) The set according to Embodiment 75 to 77, wherein the side gap includes and is greater than the corner reveal gap.
79) The set according to any one of Embodiments 68 to 78, wherein each of said first and second prefabricated construction walls further comprises an intermediate member spaced along at least a majority of the second face of the respective frame structure, and has a first side facing the frame structure and a second side facing the panel.
80) The set according to Embodiment 79, wherein said intermediate member is a buffer or one or more spacers.
81) The wall assembly according to any one Embodiments 68 to 80, wherein the exterior face is factory-finished.
82) A plate connecting mechanism configured for connecting a detachably attachable plate along a panel edge of a panel of a wall, said plate connecting mechanism comprising:
at least one mounting member having a first portion adjustably connectable to one of said wall and said detachably attachable plate, and a second portion; and
at least one magnet or metal plate connected to said second portion and configured for detachably attaching said second portion to another one of said wall and said detachably attachable plate.
83) The plate connecting mechanism according to Embodiment 82, further comprising a pivot mechanism configured for pivotally connecting the first portion to said one of said wall and said detachably attachable plate.
84) The plate connecting mechanism according to Embodiment 83, wherein said pivot mechanism is configured for fixing the mounting member at a plurality of angles.
85) The plate connecting mechanism according to any one of Embodiments 82 to 84, wherein the connection of said at least one magnet or metal plate to said second portion is adjustable along said second portion.

86) The plate connecting mechanism according to any one of Embodiments 82 to 85, wherein a connecting surface of said at least one magnet or metal plate covers at last a majority of the at least one mounting member.
87) The plate connecting mechanism according to any one of Embodiments 82 to 86, further comprising said detachably attachable plate having a solid-surface exterior face and an interior face configured to be mounted to said first portion member or comprising at least one magnet or a metal plate having ferromagnetic characteristics, configured to be detachably attached to the at least one magnet or metal plate of said second portion.
88) The plate connecting mechanism according to Embodiment 87, wherein a contact surface area of said metal plate is greater than or equal to a contact surface area of said at least one magnet.
89) The plate connecting mechanism according to Embodiments 87 or 88, wherein said exterior face of the plate is coplanar with an exterior face of said panel of said wall.
90) The plate connecting mechanism according to any one of Embodiments 82 to 89, when dependent on Embodiment 87, wherein said solid-surface exterior face of said plate is made from the same material as a solid-surface exterior face of the panel.
91) The plate connecting mechanism according to any one of Embodiments 82 to 90, when dependent on Embodiment 87, wherein the exterior face of the plate is factory-finished.
92) The plate connecting mechanism according to any one of the preceding embodiments, wherein the solid-surface exterior face or said plate comprises one or more of the following materials: an acrylic polymer, a Methyl methacrylate (MMA), an alumina trihydrate (ATH), a polyester, epoxy, composite materials, and any combination thereof.
93) A prefabricated construction wall assembly comprising:
a frame structure; and
a panel configured for covering at least a majority of a side face of the frame structure, having a solid-surface exterior face, an interior face connected to the frame structure and a panel wall extending therebetween and including an outermost panel edge at least partially lying in a panel reference plane which is perpendicular to the exterior face and to the interior face;
a buffer spaced along at least a majority of the panel, having a first side facing the frame structure, a second side facing the panel and a side wall extending therebetween, said side wall forming a duct portion being spaced from the panel reference plane by a duct gap; and
a flange adjacent to or being part of the frame structure and being disposed at least along the duct gap and at least along an interior portion of said interior face facing the duct gap, for facilitating flow of air through the duct gap.
94) The wall assembly according to Embodiment 93, wherein said panel has an air inlet extending between the solid-surface exterior face and said interior portion for providing fluid communication between an air source and said duct gap.
95) The wall assembly according to Embodiment 93 or 94, wherein: the frame structure has a first face, a second face and a frame wall extending therebetween and including an outermost frame edge at least partially lying in a frame reference plane which is perpendicular to the first face and to the second face; and the panel edge faces the frame reference plane, said panel edge being spaced from the frame reference plane thereby creating a side gap configured for facilitating the flow of the air from the duct gap therethrough.
96) The wall assembly according any one of Embodiments 93 to 95, further comprising a plurality of mechanical adapters for providing said connection of the interior face of the panel to the frame structure in a direct manner
97) The wall assembly according to Embodiment 96, wherein said mechanical adapter comprises: a first end configured to be securely introduced into the frame structure; a second end facing away from the first end and having a cavity for receiving an adhesive therein for mounting the interior face of the panel to said mechanical adapter; and a body extending between the first end and the second end; wherein said second end having an incircle diameter which is greater than a circumcircle diameter of the body.
98) The wall assembly according to Embodiment 97, further comprising a spacer configured to be disposed onto said body between the first end and the second end, and having a circumcircle diameter which is greater than a circumcircle diameter of the first end, said spacer configured for maintaining a predetermined distance between the interior face and the frame structure, said second end having an incircle diameter which is greater than said circumcircle diameter of the spacer.
99) The wall assembly according to any one of Embodiments 93 to 98, wherein said duct portion comprises a first sub-portion, a third sub-portion facing said first sub-portion and a second sub-portion extending therebetween and facing said panel reference plane; and wherein said first sub-portion and said third sub-portion are closer to the panel reference plain than said second sub-portion.
100) The wall assembly according to Embodiment 99, wherein said first sub-portion and third sub-portion are perpendicular to the second sub-portion.
101) The wall assembly according to Embodiment 99 or 100, wherein said first sub-portion is parallel to the third sub-portion.
102) The wall assembly according to any one of Embodiments 99 to 101, wherein said second sub-portion is parallel to the panel reference plane.
103) The wall assembly according to any one of Embodiments 99 to 102, wherein said exterior face of the panel is configured to be connected to a ceiling member diving the exterior face of the panel into an upper portion positioned above the ceiling member and a bottom portion positioned beneath the ceiling member.
104) The wall assembly according to Embodiment 104, when dependent on Embodiment 94, wherein said air inlet is disposed at the upper portion of the exterior face.
105) The wall assembly according to Embodiments 103 or 104, wherein when connected to the exterior face of the panel, said ceiling member is perpendicular to the exterior face of the panel.
106) The wall assembly according to any one of Embodiments 93 to 105, wherein the solid-surface exterior face comprises one or more of the following materials: an acrylic polymer, a Methyl methacrylate (MMA), an alumina trihydrate (ATH), a polyester, epoxy, composite materials, and any combination thereof.

107) The wall assembly according to any one of Embodiments 93 to 106, wherein the exterior face is factory-finished.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A illustrates a perspective view of a prefabricated construction wall assembly for construction of a corner, according to another example of the presently disclosed subject matter;

FIG. 2B illustrates an enlarged view of section B1 shown in FIG. 2A;

FIG. 3A illustrates a perspective view of a prefabricated construction wall assembly for construction of a corner, according to another example of the presently disclosed subject matter;

FIG. 3B illustrates an enlarged view of section C1 shown in FIG. 3A;

DETAILED DESCRIPTION OF EMBODIMENTS

Figure 1A:
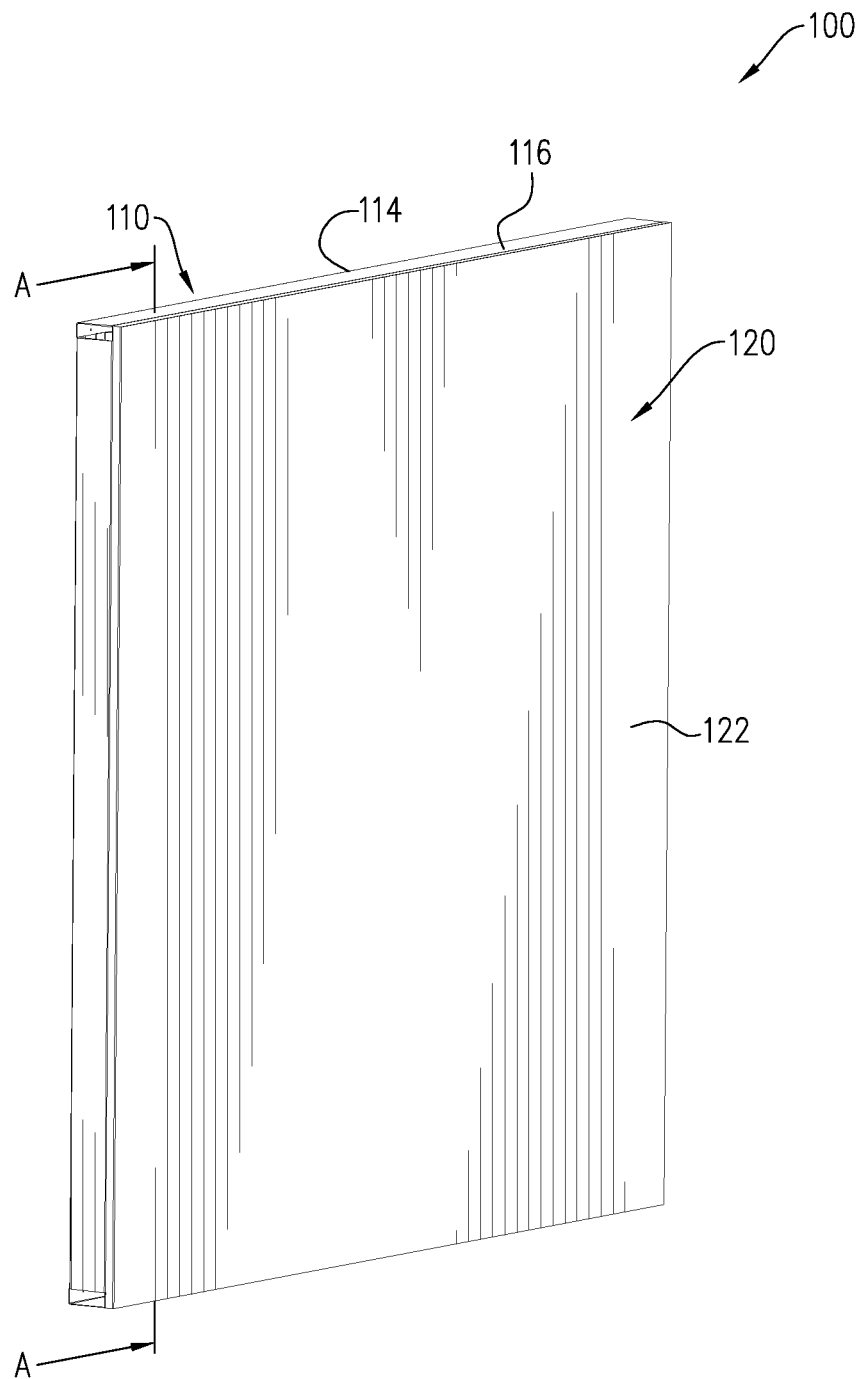
FIG. 1A illustrates a perspective view of a prefabricated construction wall assembly, according to an example of the presently disclosed subject matter.
Figure 1B:
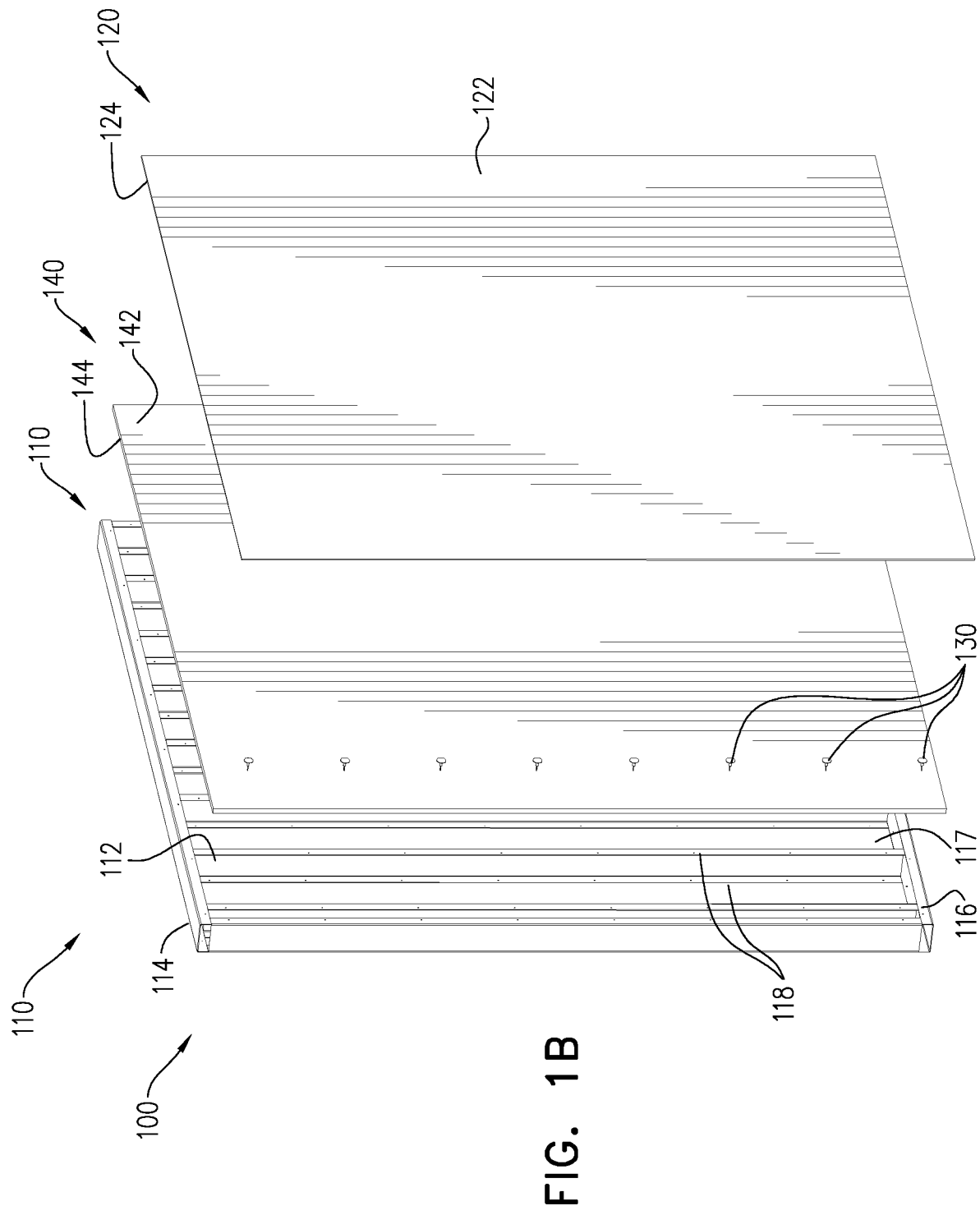
FIG. 1B illustrates an exploded perspective view of the prefabricated construction wall assembly of FIG. 1A.
Figure 1C:
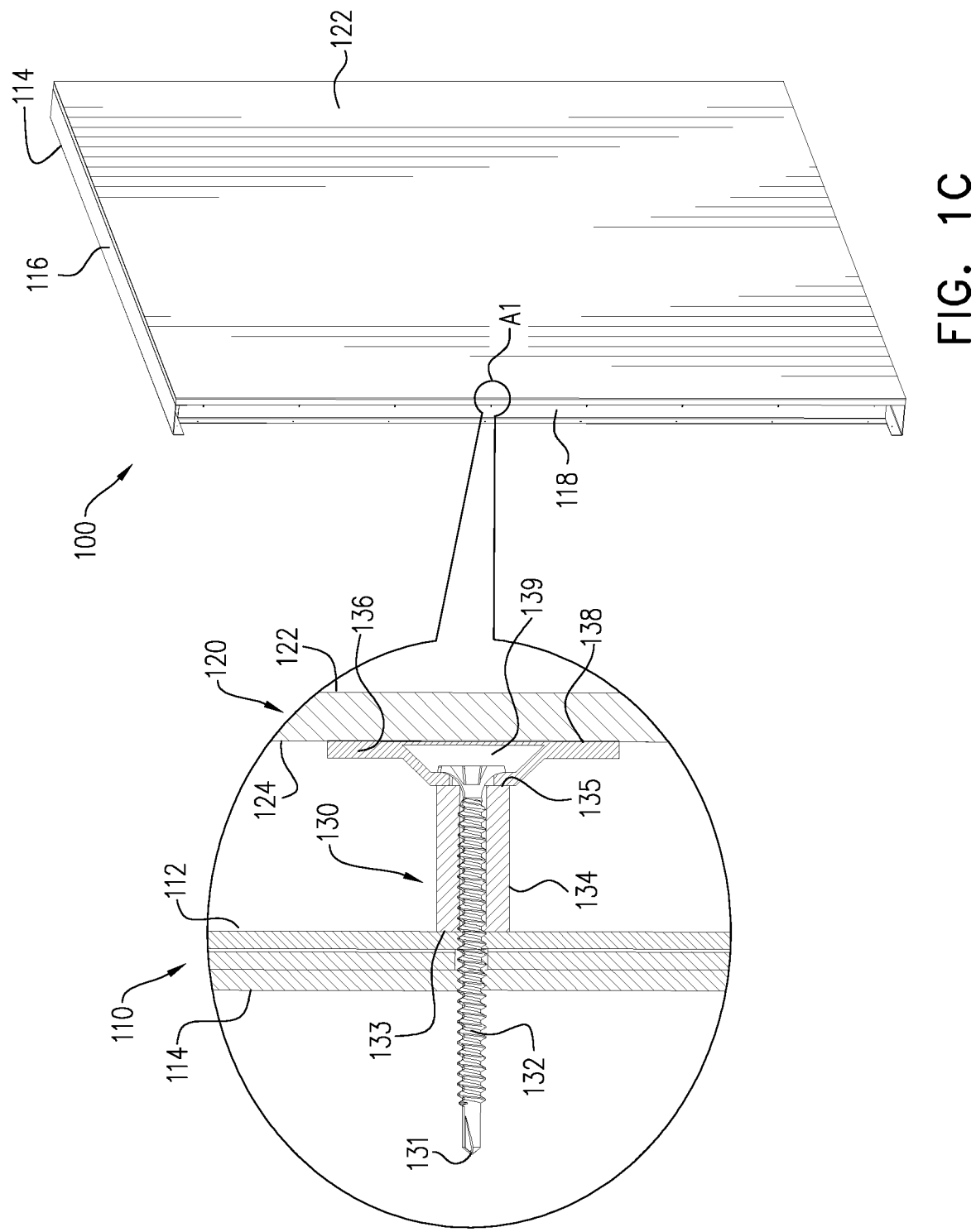
FIG. 1C illustrates a cross-sectional view along line A-A in FIG. 1A with an enlarged illustration of a side view of section A1 shown in FIG. 1C.
Figure 1D:
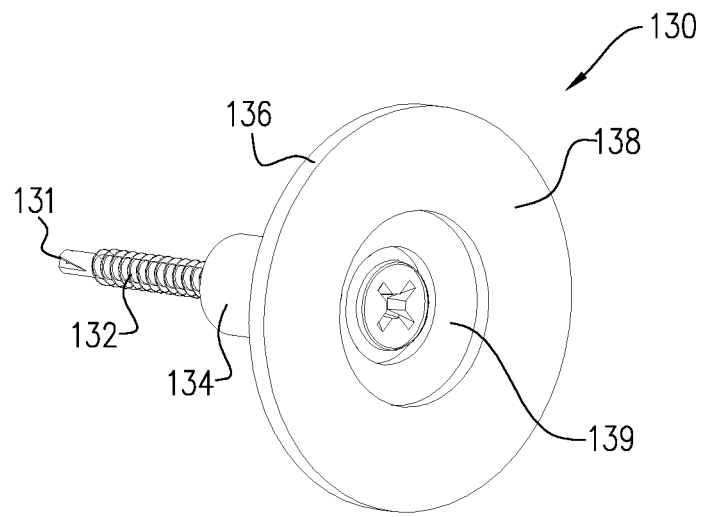
FIG. 1D illustrates a perspective view of a mechanical adapter shown in FIG. 1C.
Figure 1E:
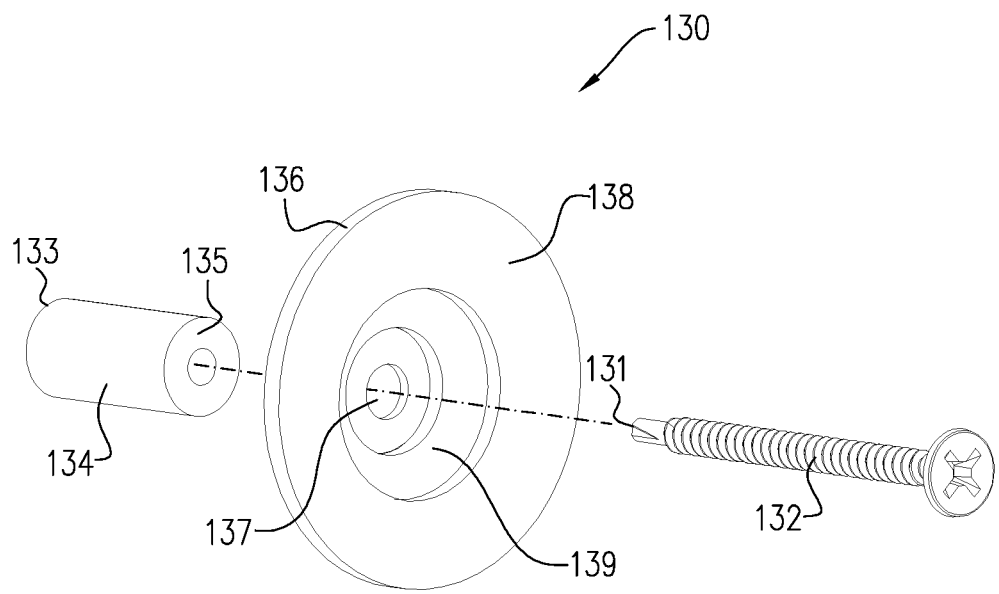
FIG. 1E illustrates an exploded perspective view of the mechanical adapter of FIG. 1D.

Reference is now made to FIGS. 1A-1E which are schematic illustrations of an example of a prefabricated construction wall assembly of the presently disclosed subject matter, generally designated as 100. The prefabricated construction wall assembly 100 comprises a frame structure 110, a panel 120 and a buffer 140 disposed therebetween.

The frame structure 110 has a first face 112 facing and connected to an interior side 124 of the panel 120 in a direct manner by an array of mechanical adapters 130. The panel 120 covers a majority of the first face 112 of frame structure 110. The panel 120 also has a solid-surface exterior face 122 facing an interior of a building structure, e.g., a room, a house, a workspace (not shown). According to the present example the entire panel 120 is formed out of a monolithic material, and is made of the same material as the exterior face 122.

The prefabricated construction wall assemblies 100 of the presently disclosed subject matter is manufactured and constructed in a factory or a workshop according to specific design requirements (e.g., architectural design) and in a precise manner, for example by a CNC machine, and ready to be transported to the construction site and assembled to each other on-site to form at least part of or an entire building structure e.g., a room, a house, a workspace, etc. The use of such prefabricated construction wall assemblies 100 enables structuring the building structure quickly and precisely, without requiring any further work on its exterior face 122. The prefabricated construction wall assembly 100 can include therein internal pre-formed openings (not shown) for accommodating different infrastructure, such as plumbing, piping and electrical and/or communication wiring.

The frame structure 110 is configured to provide structural support and stability for basic load carrying of the building structure, e.g. according to construction engineering requirements. The frame structure 110 is thus constructed from tracks 116, i.e. horizontal beams, and studs 118, i.e. vertical beams, while the tracks 116 provide horizontal support and the studs 118 provide vertical support. Constructing the frame structure 110 from the tracks 116 and the studs 118 form cavities 117. These cavities 117 can be filled with butting isolating material (not shown) for increasing thermal and/or acoustic isolation. When used for as an internal wall of a building structure, e.g. as a wall spaced between two rooms, the width of the frame structure 110 can be about 3.5 inches. Whereas when used for as an external wall of a building structure, e.g. having the second face 114 facing the outside of the building structure, the width of the frame structure 110 can be about 5.5 inches or even exceed 6 inches. When used for as an external walls face 114 can be covered with an outer-surface weatherproof exterior.

The frame structure 110 is made of light gauge steel beams According to other examples, the frame structure 110 can be made of one or more of the following materials: metal, wood, plastic, composite materials, and any combination thereof.

The panel 120 is made of Corian®. According to other example, the panel 120 can be made of synthetic/man-made materials, for example, comprising one or more of the following materials: an acrylic polymer, a Methyl methacrylate (MMA), an alumina trihydrate (ATH), a polyester, epoxy, composite materials, and any combination thereof. According to other example, the solid-surface factory-finished exterior face 124, or the entire panel 120 can be for example, one of the following brands: Avonite Surfaces®, HI-MACS®, KRION®, etc. The solid surface material can be non-porous, impermeable, low-maintenance, stain resistant, thermoform-able, moisture resistant, heat resistant, easy to clean, anti-scratching, anti-bacterial, hard-wearing, highly resistant, easy connectable to one another. The factory-finished character of the exterior face 124 allows using it as is after the assembly of the prefabricated construction wall assembly 100 on site, without requiring any further finishing, such as applying coating, scraping, painting, etc.

The frame structure 110 has a first thermal expansion coefficient while the panel 120 has a second thermal expansion coefficient, which is different from the first thermal expansion coefficient.

The connection between the interior face 124 and the frame structure 110 is provided in a directed manner at a plurality of connection areas. The thermal expansion of the frame structure 110 and the exterior face 122 (or the entire panel) can result from temperature changes e.g., weather changes, air-conditioning, etc., at the vicinity e.g., within or outside, of the building structure during the day and/or the night, and long term stability of the prefabricated construction wall assembly 100 to withstand such changes is highly important. The panel 120 is made a uniform material so that the thermal expansion coefficient of the exterior face 122 and the interior face 124 is the same, and is greater than the thermal expansion coefficient of the frame constriction 110. According to the present example, the frame structure which is made of light gauge steel, has a thermal expansion coefficient at 20° C. of between about $11 \times 10^{-6} (° C.)^{-1}$ and about $13 \times 10^{-6} (° C.)^{-1}$, whereas, the panel 120 which is made of Corian®, has a thermal expansion coefficient at 20° C. of about $39 \times 10^{-6} (° C.)^{-1}$. Since the thermal expansion coefficient of panel 120 is greater than the thermal expansion coefficient of the frame structure 110, panel 120 will expand i.e. enlarge its dimension, more than frame structure 110, e.g. when exposed to the same temperature change. The enlargement of the relative expansion and change in dimension between panel 120 with respect to frame structure 110 can be even greater, e.g. when the wall assembly 100 is used as an exterior wall of a building structure. The increase in enlargement of the relative expansion between panel 120 with respect to frame structure 110 can be due to heating within the building, exposing the panel 120 to hot temperature, while the second face 114 of the frame structure is exposed to low temperature outside the building structure, e.g. during winter. Therefore, the mechanical adapters 130 are configured to connect panel 120 to the frame structure 110 while enabling such change in the structural formation of the wall assembly 100.

The mechanical adapters 130 are configured for providing a connection between frame structure 110 and interior face 124 so as to withstand the thermal expansion or contraction structural differences or other structural differences between the frame structure 110 and the panel 120 including exterior face 122. Other structural differences between the frame structure 110 and the panel 120 can be caused by natural phenomena, such as earthquakes, heavy snow or wind.

Although not explicitly illustrated, the mechanical adapters 130 are arranged as an array for directly connecting the frame structure 110 and the interior face 124 of the panel 120. The mechanical adapters 130 are equally spaced from each other at a predetermined distance. The predetermined distance ensures that no depressions or "sinking" of the panel 120 can be created between panel 120 and frame structure 110, for example, due to self-weight of panel 120. Furthermore, by connecting the interior face 124 of the panel 120 and the frame structure 110 in a direct manner, e.g. by an array of mechanical adapters 130, the prefabricated construction wall assembly 100 would be able to withstand the thermal expansion or contraction structural differences between the frame structure 110 and the exterior face 122. Using an array of mechanical adapters 130 to connect the panel 120 to the frame structure 110 can further ensure that the wall assembly 100 can withstand other structural differences between the frame structure 110 and the panel 120, e.g. caused by earth displacements such as earthquakes, landslides and/or land sinks.

Each of the mechanical adapters 130 has an elongated shape, and comprises a first end 131 configured to be securely introduced (i.e., screwed) into the frame structure 110, a second end 136 facing away from the first end 131 and a body 132 extending between the first end 131 and the second end 136. The second end 136 has a circumcircle diameter which is greater than a circumcircle diameter of the body 132. The surface 138, disposed at the second end 136 is configured for mounting the interior face 124 of the panel 120 to the mechanical adapter 130. The mechanical adapter 130 further comprises a stopper, which is disposed onto the body 132 between the first end 131 and the second end 136. In some embodiments of the presently disclosed subject matter, the stopper also acts as a spacer, e.g. spacer 134. The stopper is configured for maintaining a predetermined distance between the interior face 124 and the frame structure 110, therefore the spacer 134 has a circumcircle diameter which is greater than a circumcircle diameter of the first end 131. The surface 138 of the second end 136 of the mechanical adapter 130 defines cavity 139 configured for receiving an adhesive therein. The cavity 139 has an incircle diameter which is greater than or equal to the circumcircle diameter of the spacer 134. The adhesive can be made of any know strong adhesive material such as: silicone, acrylic, ms-polymer, single or dual silicon, double sided adhesive tape, double component glue, epoxy, and any combination thereof.

The spacer 134 has a first face 133 which is configured for facing the frame structure 110 and an opposite second face 135 configured for facing the interior face 124 of the panel 120. Since the spacer 134 is used for maintaining and/or creating a predetermined distance between panel 120 and construction frame 110, the space created can be used to enable insertion of buffer 140 therebetween, and the predetermined distance can therefore be set according to the thickness of the buffer 140. The thickness of the buffer 140 can vary form one buffer to the other, e.g. depending on the material used, the required thermal and/or acoustic isolation and/or if the wall is designed to be an external or an internal wall. However, the commonly used thickness of the buffer 140 is the range between about 0.5 inch and about 1.5 inches thick, e.g. when using Extruded Polystyrene (XPS), Expanded polystyrene (EPS), Closed-cell polyisocyanurate (PIR), Silica aerogel and any combination thereof. The buffer 140 is provided herein as a solid sheet and is spaced along the majority of the panel 120.

The buffer 140 is configured to provide isolation, e.g. thermal and/or acoustic, despite the fact that cavities 117 can be filed with butting isolating material, e.g. for thermal isolation. By positioning the buffer 140 between the panel 120 and the frame structure 110, the buffer 140 provides thermal isolation which may reduce the "thermal bridge" phenomena which can be caused by direct contact of the frame structure 110 and panel 120. In another embodiment of the presently disclosed subject matter, the interior face 124 can act as or comprise the buffer 140. In some embodiments, for example, upon use of the buffer 140, the mechanical adapters 130 can further provide structural support for buffer 140.

Although not illustrated, the prefabricated construction wall assembly 110 can further comprise a thermal conductive sheet, for example, a metal sheet, which can cover at least of a majority of the interior side 124 of the panel 120 and directly adhered thereto. The thermal conductive sheet can comprise at least one tube configured for conveying thermal conductive fluid. The at least one tube can be positioned between the thermal conductive sheet and the interior side 124 of the panel 120, wherein the at least one tube can be thermally coupled to the thermal conductive sheet for dispersing the temperature of the fluid along the panels 120. The thermal conductive fluid can be a hot water configured for heating the exterior face 122 of the panel 120, and thereby the interior of the building structure.

According to this embodiment of the presently disclosed subject matter, spacer 130 has a cylindrical shape, such that first face 133 is parallel to second face 135. The first face 133 of the spacer 134 is adjacent to the frame structure 110 and the second face 135 spaced therefrom can be configured to be adjacent to the second end 136 of the mechanical adapter 130. The surface 138 of the second end 136 can comprise a cavity 139, e.g. for receiving an adhesive therein.

The body 132 can be at least partially tilted so as to withstand the above described thermal expansion or contraction structural differences between the frame structure 110 and the exterior face 132. For example, the body 132 can be at least partially tilted towards a direction which is lateral to the longitudinal axis of the body 132 to withstand the thermal expansion or contraction structural differences between the frame structure 110 and an exterior face 122 of the panel 120.

The body 132 is threaded through a hole 137 of the second end 136. The hole 137 is positioned at a center of the surface 138. The incircle diameter of the hole 137 is smaller than the incircle diameter of the cavity 139. The body 132 of the mechanical adapter 130 is a screw.

Figure 2D:
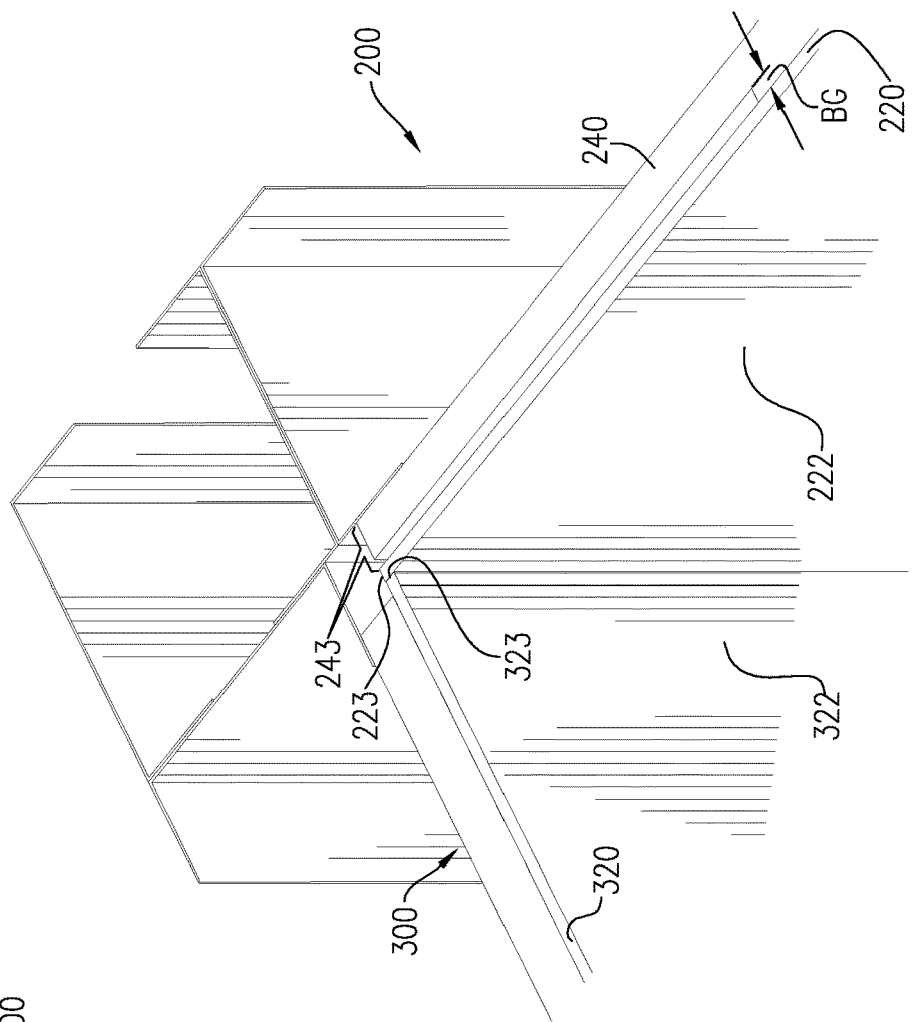
FIG. 2D illustrates an enlarged view of section B2 shown in FIG. 2C.
Figure 2C:
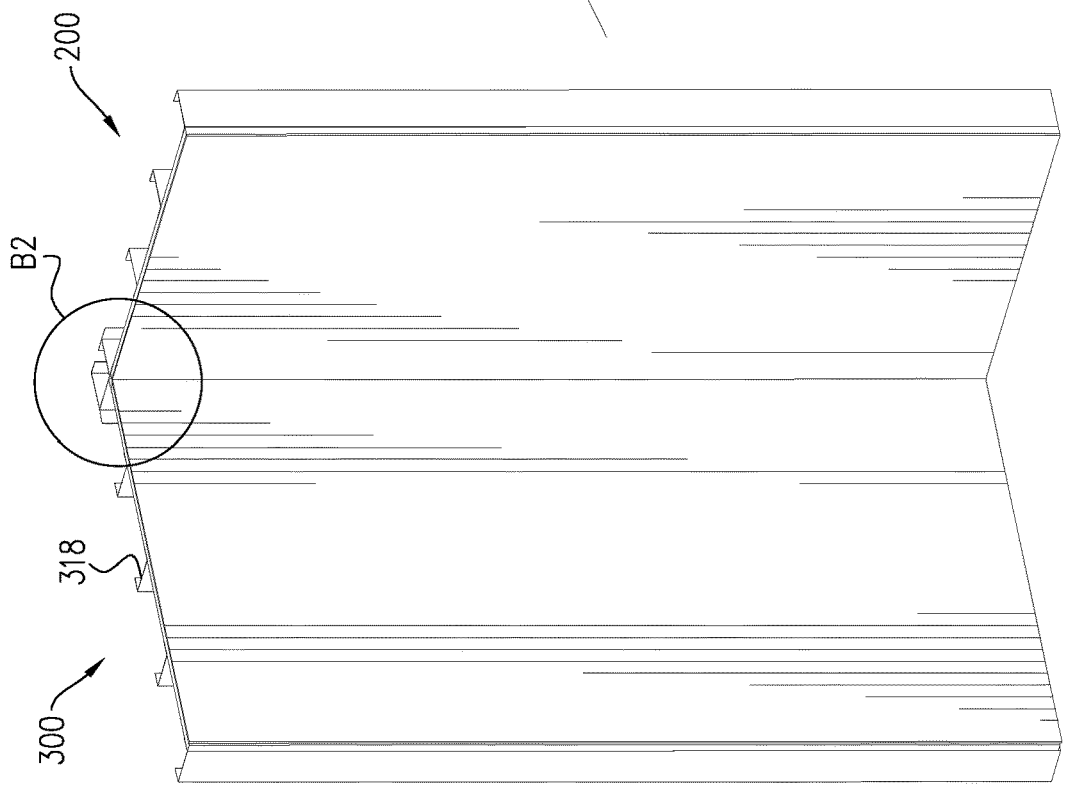
FIG. 2C illustrates a perspective view of the prefabricated construction wall assembly of FIG. 2A, being connected to another prefabricated construction wall assembly, forming together a corner.

Reference is now made to FIGS. 2A-2D which are schematic illustrations of another example of a prefabricated construction wall assembly for construction of a corner of the presently disclosed subject matter, generally designated as 200. The prefabricated construction wall assembly 200 comprises a frame structure 210, a panel 220 and a buffer 240 disposed therebetween.

The frame structure 210 has a first face 212 facing and connected to an interior side 224 of the panel 220 in a direct manner by an array of mechanical adapters 130, similar to and including all of the characteristics of the prefabricated construction wall assembly 100 previously disclosed hereinabove. The panel 220 covers a majority of the first face 212 of frame structure 210. The panel 220 also has a solid-surface exterior face 222 facing an interior of a building structure e.g., a room, a house, a workspace. According to the present example the entire panel 220 can be formed out of a monolithic material, and can be made of the same material as its exterior face 222. The panel 220 is bendable, at least to some extent.

The frame structure 210 is configured to provide structural support and stability for basic load carrying of the building structure, e.g. according to construction engineering requirements. The frame structure 210 is thus constructed from tracks (not shown), i.e. horizontal beams, and studs 218, i.e. vertical beams, similar to and including all of the characteristics of the frame structure 110 previously disclosed hereinabove.

The frame structure 210 is connected to an interior side 224 of the panel 220 in a direct manner by an array of mechanical adapters 130. The mechanical adapters 130 are configured for providing connection between the frame structure 210 and the interior face 224 so as to prevent the panel 220 from being bent at an area between the mechanical adapters 130

The wall panel 223 includes an outermost panel edge 223a at least partially lying in a panel reference plane RP1, which is perpendicular to the exterior face 222 and to the interior face 224. The side wall 243 of the buffer 240 is at least partially spaced from the panel reference plane RP1, e.g. by a back gap BG. According to this aspect, at least a portion 224a of the panel 220 including the panel edge 223a can be bendable, e.g. into at least some of the back gap BG, which can be free of a non-elastic material or free of any material. The term 'non-elastic material' refers to any rigid material that can prevent the portion 224a of the panel 220 including the panel edge 223a to be bent into the back gap BG upon application of a reasonable pressure force thereon by an adjacent panel edge as a result of thermal explanation of the panel of the adjacent panel edge.

In order to enable the panel 220 to bend into at least some of the back gap BG, the side wall 243 of the buffer 240 comprises a first portion 243a and a second portion 243b shifted with respect to the first portion 243a along a third portion 243c so that the first portion 243a is closer to the panel reference plain RP1 than the second portion 243b. The back gap BG is therefore defined by the second portion 243b and the third portion 243c of the side wall 243 and the interior face 224 of a portion 224a of the panel 220 and can extended along and including the panel edge 223a.

According to an example of the presently disclosed subject matter the first portion 243a and the second portion 243b of the side wall 243 of the buffer 240 are parallel to the panel reference plane RP1. Whereas the third portion 243c of the side wall 243 of the buffer 240 is parallel to the interior face 224 and perpendicular to the panel reference plane RP1.

Although not shown, the third portion 243c of the side wall 243 of the buffer 240 can be position with respect to the interior face 224 at an angle, e.g. different from 180°. Additionally, the first portion 243a does not have to be parallel to second portion 243b and both first portion 243a and 243b can be positioned at an angel with respect to the panel reference plane RP1. According to other examples, the side wall 243 can have any geometrical structure, in which a portion therefore is spaced from the reference plane RP1

Although not shown, the back gap BG can also be defined by a portion of the first face 212 facing the interior face 224 of the portion 224a of the panel 220, the side wall 243 and portion 224a of the panel 220. The back gap BG according to the present example is free of any material.

The prefabricated construction wall assembly of this aspect is configured to enable two prefabricated construction wall assemblies 100, 200 and 300, to be constructed adjacent to each other to form a corner of the building structure. The formation of the corner is such that a panel edge 323a of wall assembly 300 is positioned very close, even without any reveals from an exterior face 222 of the bendable portion 224a of the wall assembly 200. In this configuration, thermal expansion of the panel 320 including the panel edge 323a of the wall assembly 300, e.g. due to temperature variations, would cause panel edge 323a to apply pressure onto the portion 224a of the wall assembly 200, which in turn would be bent into the back gap BG of the wall assembly 200. In other words, the back gap BG provides space for the bendable portion 224a to be bend, e.g. upon thermal expansion of the panel 320 of the wall assembly 300 or due to pressure applied thereon. Although not shown in this example, wall assembly 300 can be any one of wall assembly 100 or wall assembly 200, disclosed hereinabove.

Figure 3C:
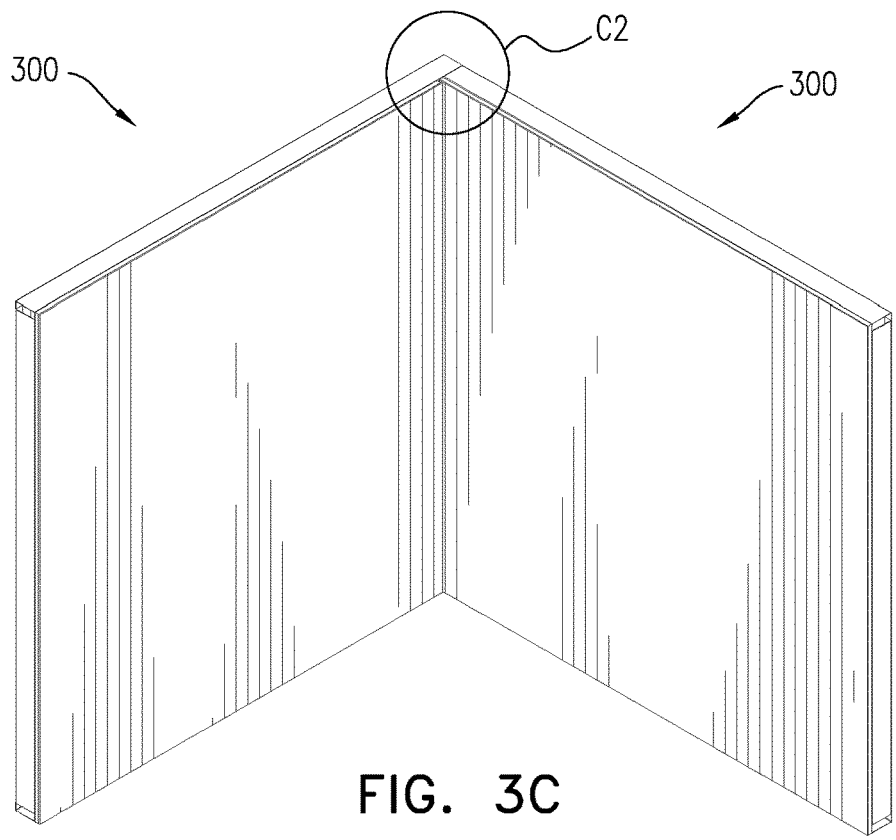
FIG. 3C illustrates a perspective view of the prefabricated construction wall assembly of FIG. 3A, being connected to another prefabricated construction wall assembly, forming together a corner.
Figure 3D:
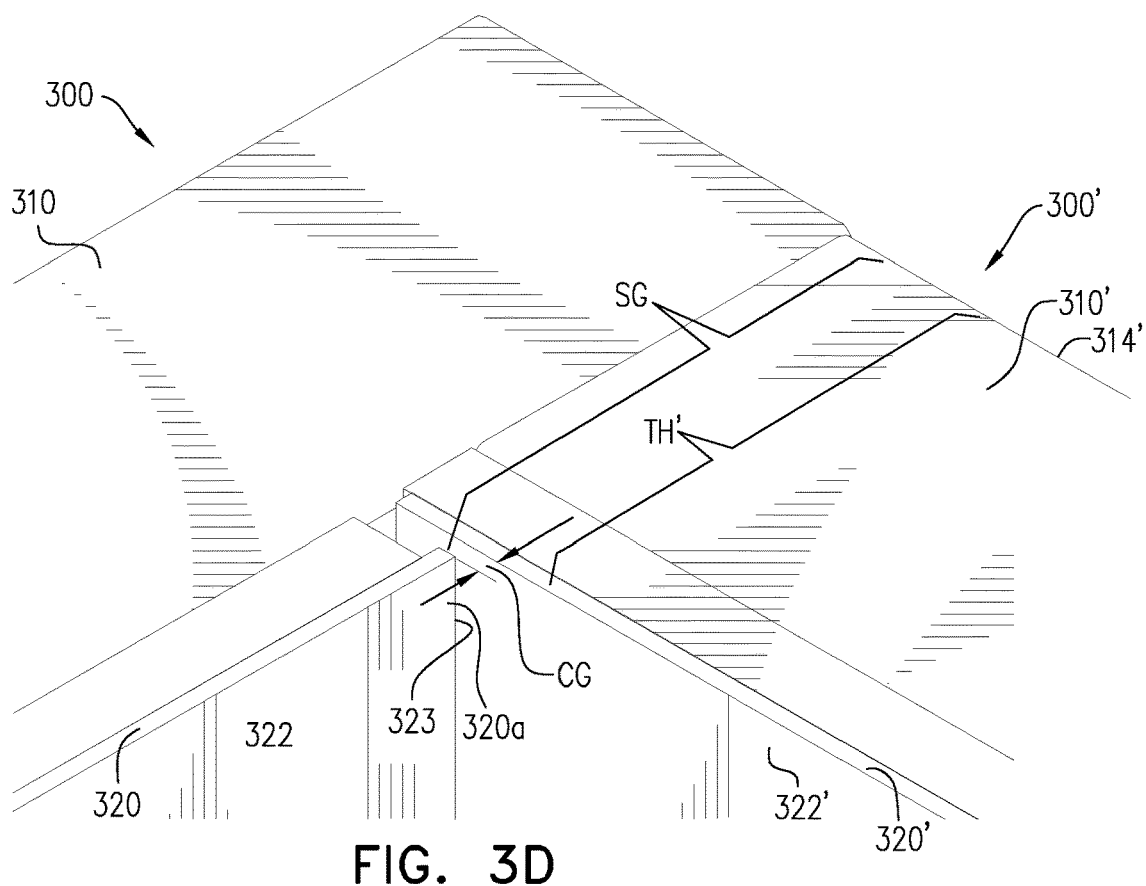
FIG. 3D illustrates an enlarged view of section C2 shown in FIG. 3C.

Reference is now made to FIGS. 3A-3D which are schematic illustrations of another example of a prefabricated construction wall assembly for construction of a corner of the presently disclosed subject matter, generally designated as 300. The prefabricated construction wall assembly 300 comprises a frame structure 310, a panel 320 and a buffer 340 disposed therebetween.

The frame structure 310 has a first face 312 facing and connected to an interior side 324 of the panel 320 in a direct manner by an array of mechanical adapters 130, similar to and including all of the characteristics previously disclosed hereinabove with respect to the prefabricated construction wall assembly 100. The panel 320 covers a majority of the first face 312 of frame structure 310. The panel 320 also has a solid-surface exterior face 322 facing an interior of a building structure e.g., a room, a house, a workspace. According to the present example the entire panel 320 is formed out of a monolithic material, and is made of the same material as its exterior face 322. The panel 320 is expandable or contractible, at least to some extent.

The frame structure 310 is configured to provide structural support and stability for basic load carrying of the building structure, e.g. according to construction engineering requirements. The frame structure 310 is thus constructed from tracks 316, i.e. horizontal beams, and studs 318, i.e. vertical beams, similar to and including all of the characteristics of the frame structure 110 previously disclosed hereinabove.

The frame structure 310 is connected to an interior side 324 of the panel 320 in a direct manner by an array of mechanical adapters 130. The mechanical adapters 130 are configured for providing connection between frame structure 310 and interior face 324 such as to withstand panel 320 being expanded or contracted, e.g. due to the thermal expansion or contraction structural differences between the frame structure 210 and the panel 320 including exterior face 322, as disclosed hereinabove.

The prefabricated construction wall assembly 300 comprises a frame structure 310 which has a first face 312, a second face 314 and a frame wall 313 extending therebetween. The frame wall 313 includes an outermost frame edge 313a at least partially lying in a frame reference plane RP2 which is perpendicular to the first face 312 and to the second face 314. The panel 320 includes an outermost panel edge 323a facing the frame reference plane RP2. The panel edge 323a is spaced form the frame reference plane RP2 thereby creating a side gap SG. The panel 320 is expandable towards the frame reference plane RP2, so that at least the panel edge 323a can be displaced into at least some of the side gap SG. The side gap SG is free of a non-elastic material or any material at all.

The prefabricated construction wall assembly 300 is configured to enable two prefabricated construction wall assemblies 100, 200 or 300 to be constructed adjacent to each other to form a corner of the building structure. The panel edge 323a of wall assembly 300 can be positioned very close to an exterior face 322' of the panel 320' of the wall assembly 300', such that a side gap SG is maintained therebetween. In this example, the frame structure 310 of the wall assembly 300 is directly connected to the frame structure 310' of the wall assembly 300', forming together the corner. According to this example, the side gap SG is sized so at to receive the thickness TH' of the wall assembly 300', and the side gap SG still has enough space left between the panel edge 323a of the wall assembly 300 and the exterior face 322' of the panel 320' of the wall assembly 300' to enable the expansion of the panel 320 of the wall assembly 300. The space formed between the panel edge 323a and the exterior face 322' is defined as a corner reveal gap CG. The corner reveal gap CG is the part of the side gap SG, and has smaller dimensions than the side gap SG. The dimension of the side gap SG is equal to the thickness TH' of the wall assembly 300' and the corner reveal gap CG. The side gap SG thus is greater than a wall assembly thickness TH', which is defined as a distance between an exterior face 322' of a panel 320' and a first face 314' of a frame structure 310' of wall assembly 300', a side 313' of which can be configured to be received therein. The second face 312 of the frame structure thus comprises a sub portion 312a, facing the side gap SG, which can be configured for being mounted to a frame structure of the wall assembly 300', so as to accommodate its thickness TH'.

Although not shown, the dimension of the side gap SG can be greater than the thickness TH' of the wall assembly 300' and the corner reveal gap CG.

In this example, thermal expansion of the panel 320 including the panel edge 323a, e.g. due to temperature variations, would cause the panel 320 to expand so that its panel edge 323a is displaced towards panel 320' of the wall assembly 300'. Due to the side gap SG, the expansion of the panel 320 would not cause the panel edge 323a to apply pressure onto the panel 320' of the wall assembly 300'. In other words, the side gap SG provides space for the expanded portion 320a of the panel 320 due to the thermal expansion thereof.

Although not shown, wall assembly 300' can have a back gap BG' as detailed hereinabove. The back gap BG' can enable panel 320' to be bendable, e.g. into at least some of the back gap BG', for example when corner reveal gap CG can be smaller than the expanded portion 320a of panel 320. For example, upon thermal expansion of the panel 320 of the wall assembly 300, causing panel 320 to apply pressure onto panel 320'.

The frame structure 310 has a first thermal expansion coefficient, and the panel 320 has a second thermal coefficient, which is greater than the first thermal coefficient, as detailed hereinabove with respect to wall assembly 100. This feature can cause the panel 320 to have greater expansion reaction to temperature variations with respect to the frame structure 310, and the side gap SG is configured to provide space to the expanded portion upon the expansion.

Although not shown in this example, wall assembly 300 or 300' can be any one of wall assembly 100 or wall assembly 200, disclosed hereinabove.

The side gap SG is free of any material.

The side gap SG is greater than a wall assembly thickness of another wall assembly 100, 200 or 300, which may is defined as a distance between the exterior face 122, 222 or 322 of the panel 120, 220 or 320 and the first face 114, 214 or 314 of the frame 110, 210 or 310.

The panel 320 has a panel distance PD which is defined as a distance between the panel edge 323a and an opposite outermost second panel edge 323b. The frame structure 310 has a frame distance FD which is defined as a distance between the frame edge 313a and an opposite outermost second frame edge 313b, the panel distance PD is shorter than to the frame distance FD. Although not shown the panel distance PD can be equal or greater than the frame distance FD.

Figure 4A:
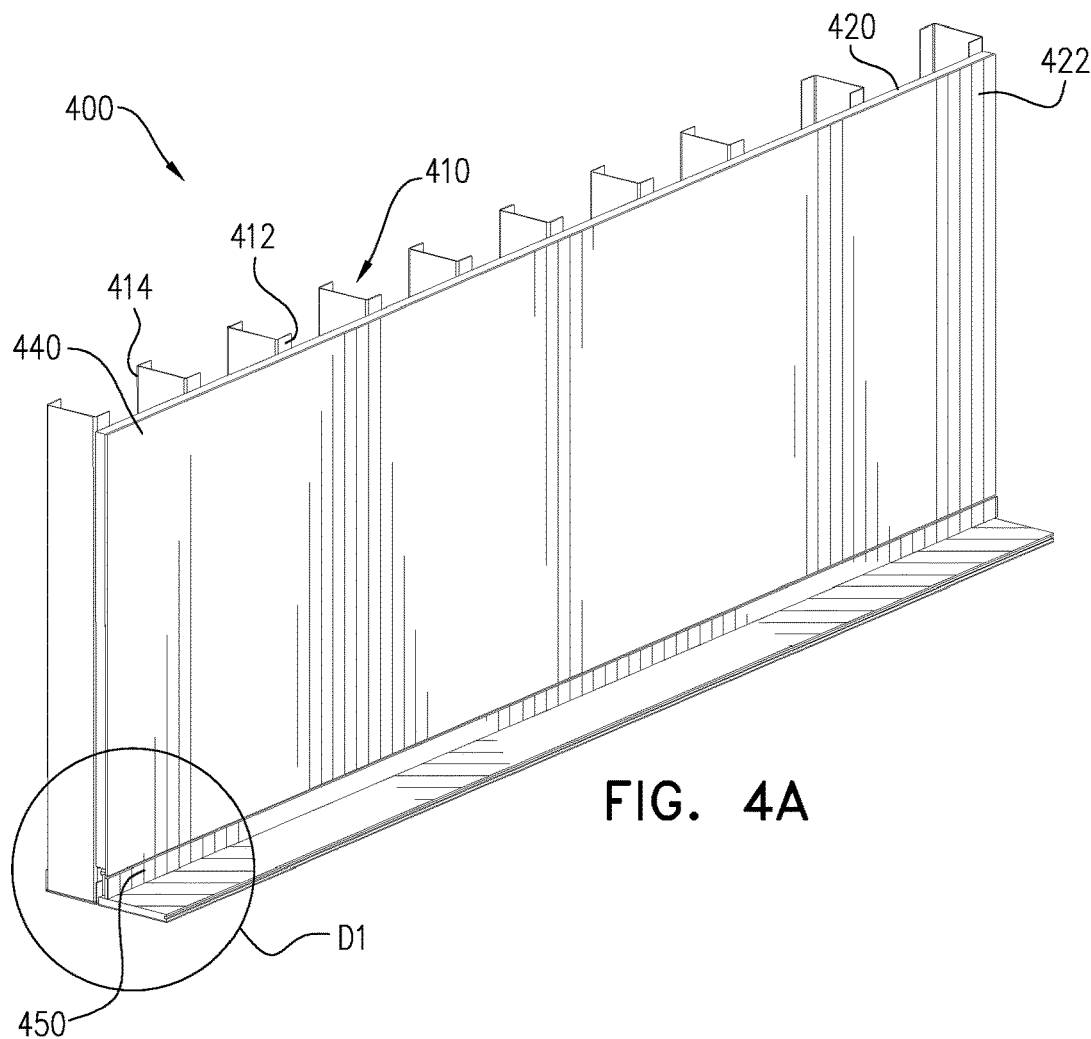
FIG. 4A illustrates a perspective view of a prefabricated construction wall assembly including a detachably attachable plate.
Figure 4B:
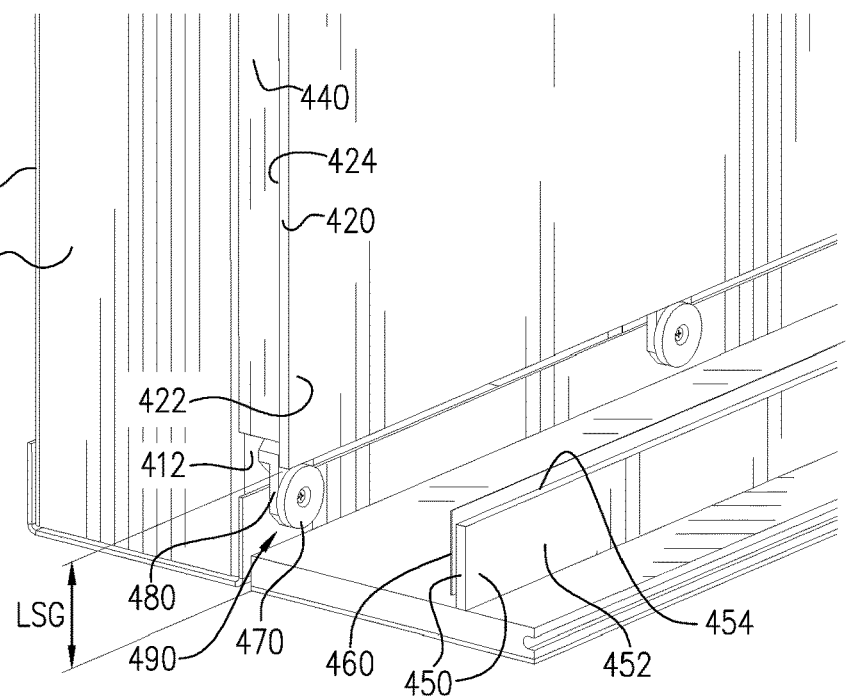
FIG. 4B illustrates an enlarged view of section D1 shown in FIG. 4A, at a detached position of the plate.
Figure 4C:
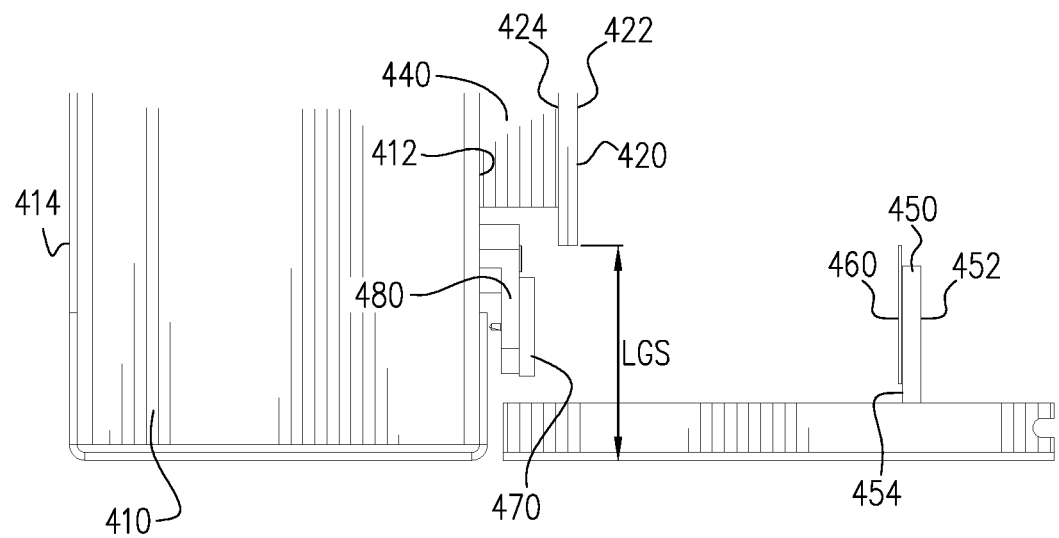
FIG. 4C illustrates a side view of the section D1 shown in FIG. 4B.
Figure 4D:
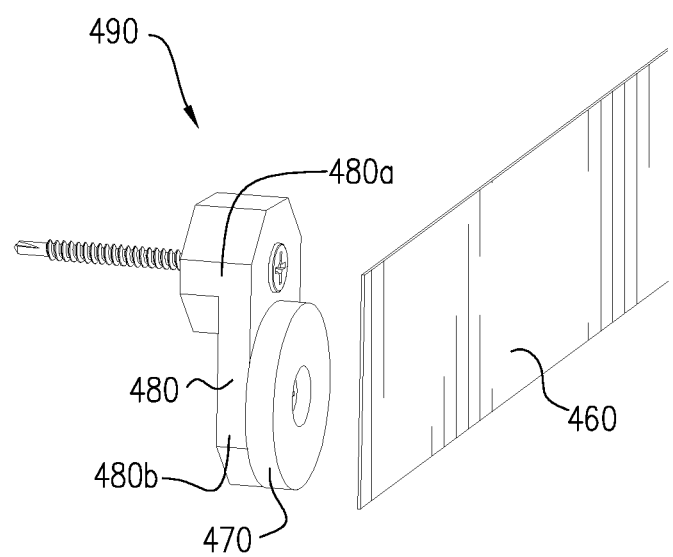
FIG. 4D illustrates a perspective view of a mounting member and a metal plate of the prefabricated construction wall assembly of FIG. 4A.
Figure 4E:
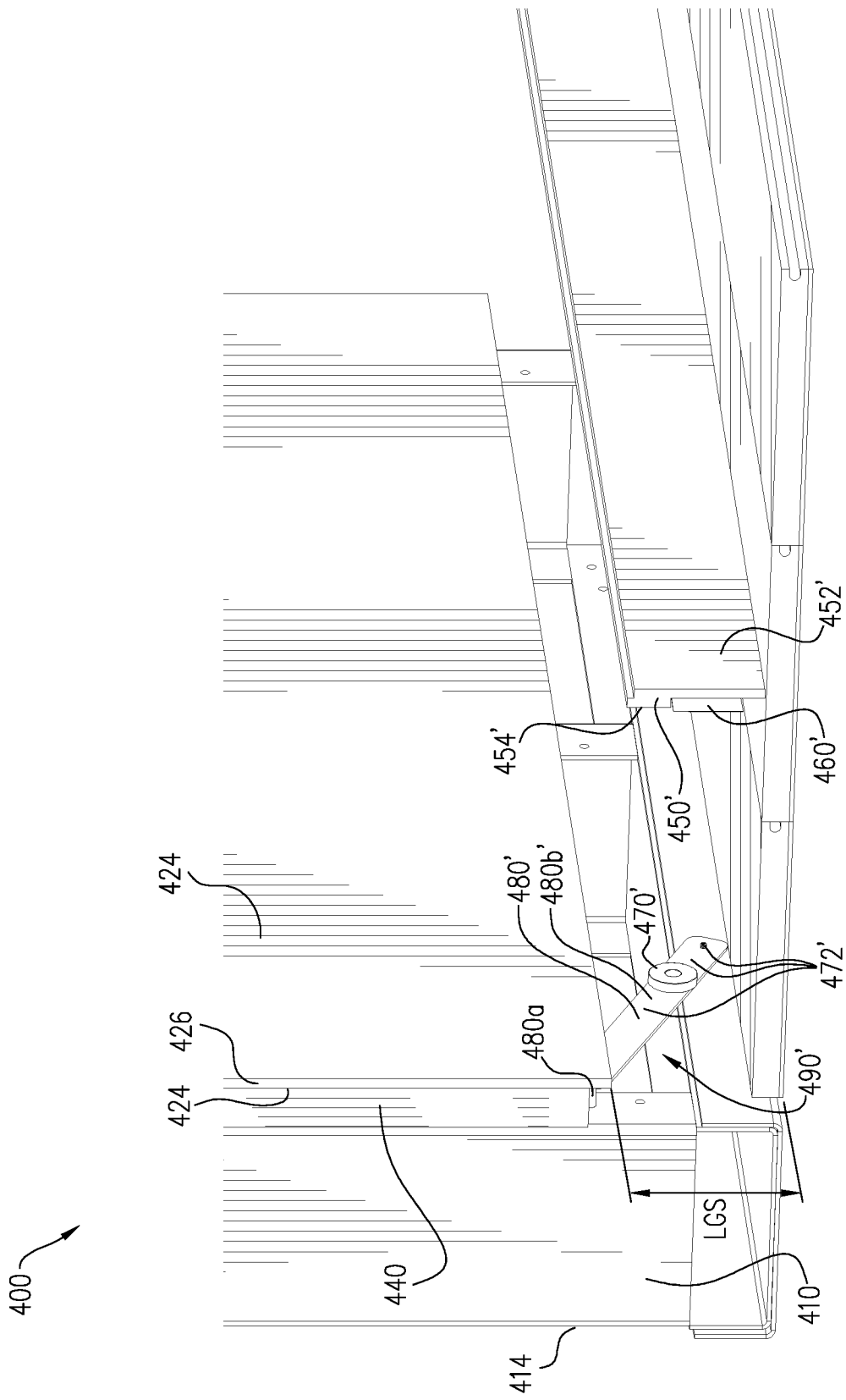
FIG. 4E illustrates an enlarged view perspective of another prefabricated construction wall assembly including a detachably attachable plate, at a detached position of the plate.

Reference is now made to FIGS. 4A-4E which are schematic illustrations of a prefabricated construction wall assembly including a detachably attachable plate of the presently disclosed subject matter, generally designated as 400.

The wall assembly 400 is similar to and includes all of the characteristics of the prefabricated construction wall assemblies 100, 200 or 300 previously disclosed hereinabove, further comprises a plate connecting mechanism, which is configured for connecting a detachably attachable plate along the panel edge within the side gap.

The plate connecting mechanism 490 comprises at least one magnet 470. The magnet 470 is configured for detachably attaching the plate 450, e.g. within a large side gap LSG. The plate connecting mechanism 490 comprises at least one mounting member 480, which has a first portion 480a pivotally connectable to the wall assembly 400. The first portion 480a is pivotally connected to any one of the following parts of the wall assembly 400: the frame structure 410, the panel 420, the intermediate member 440, and any combination thereof. The mounting member 480 further has a second portion 480b provided with the at least one magnet 470. The wall assembly 400 further comprises the detachably attachable plate 450, which has a solid-surface exterior face 452, e g similar to the exterior face 422 of the panel 420, and an interior face 454. The interior face 454 of the plate 450 includes a metal plate 460 having ferromagnetic characteristics, such that the plate 450 is configured to be detachably attached to the at least one magnet 470 of the plate connecting mechanism 490, thereby securing the plate 450 within the large side gap LSG.

In addition, when the interior face 454 of the plate 450 is connected to the connecting mechanism 490 the exterior face 422 of the plate 420 is coplanar with the exterior face 422 of the panel 420. In order of the plate 450 to blend in within the large side gap LSG without standing out, the solid-surface exterior face 452 of the plate 450 is made from the same material as the solid-surface exterior face of the panel 420.

In another example the plate connecting mechanism 490' comprises at least one magnet 470'. The magnet 470' is configured for detachably attaching the plate 450', e.g. within a large side gap LSG. The plate connecting mechanism 490' comprises at least one mounting member 480', which has a first portion 480a pivotally connectable to the wall assembly 400. The first portion 480a is pivotally connected to any one of the following parts of the wall assembly 400: the frame structure 410, the panel 420, the intermediate member 440, and any combination thereof. The mounting member 480' further has a second portion 480b' provided with the at least one magnet 470'. The second portion 480b' further comprises adjustable elements 472' configured for adjusting the positioning of the at least one magnet 470' along the second portion 480b'. Although not shown, adjustable elements 472' can enable the mounting of more than one magnet 470' along the second portion 480'.

The wall assembly 400 further comprises the detachably attachable plate 450', which has a solid-surface exterior face 452', e g similar to the exterior face 422 of the panel 420, and an interior face 454'. The interior face 454' of the plate 450' includes a metal plate 460' having ferromagnetic characteristics, such that the plate 450' is configured to be detachably attached to the at least one magnet 470' of the plate connecting mechanism 490', thereby securing the plate 450' within the large side gap LSG.

Although not shown, the at least one magnet 470 can be replaced with a metal plate having ferromagnetic characteristics, as long as metal plate 460 is equally replaced with an at least one magnet. Such that a magnetic detachable attachment is occurred between plate 450 and the plate connecting mechanism 490.

The difference of areas of the metal plate and the magnets allows easily and slightly adjusting the location of the plate 460 with respect to the wall. Having contact surfaces with different surface areas can enable better connection between the two surface areas, e.g. even when the metal plate 460 may not be aligned with the at least one magnet 470 they will still have at least some common surface are which can enable them to connect to each other.

In addition, the use of magnets can enable overcoming small distance in-accuracies, e.g. since the force of the at least one magnet 470 can attract the metal plate 460 from a distance, the plate 460 can still be connected to the connecting mechanism 490 even if not all of the surface area of the magnet 470 is in direct contact with the metal plate 460.

Although not shown, connecting mechanism 490 can be attached to interion face 454 of the plate 450. In this example, magnet 470 can be attached directly to the frame structure 410, e.g. when constructed form metal beams having ferromagnetic characteristics, or to plate 460 secured to any one of the following parts of the wall assembly 400: the frame structure 410, the panel 420, the intermediate member 440, and any combination thereof.

Figure 5A:
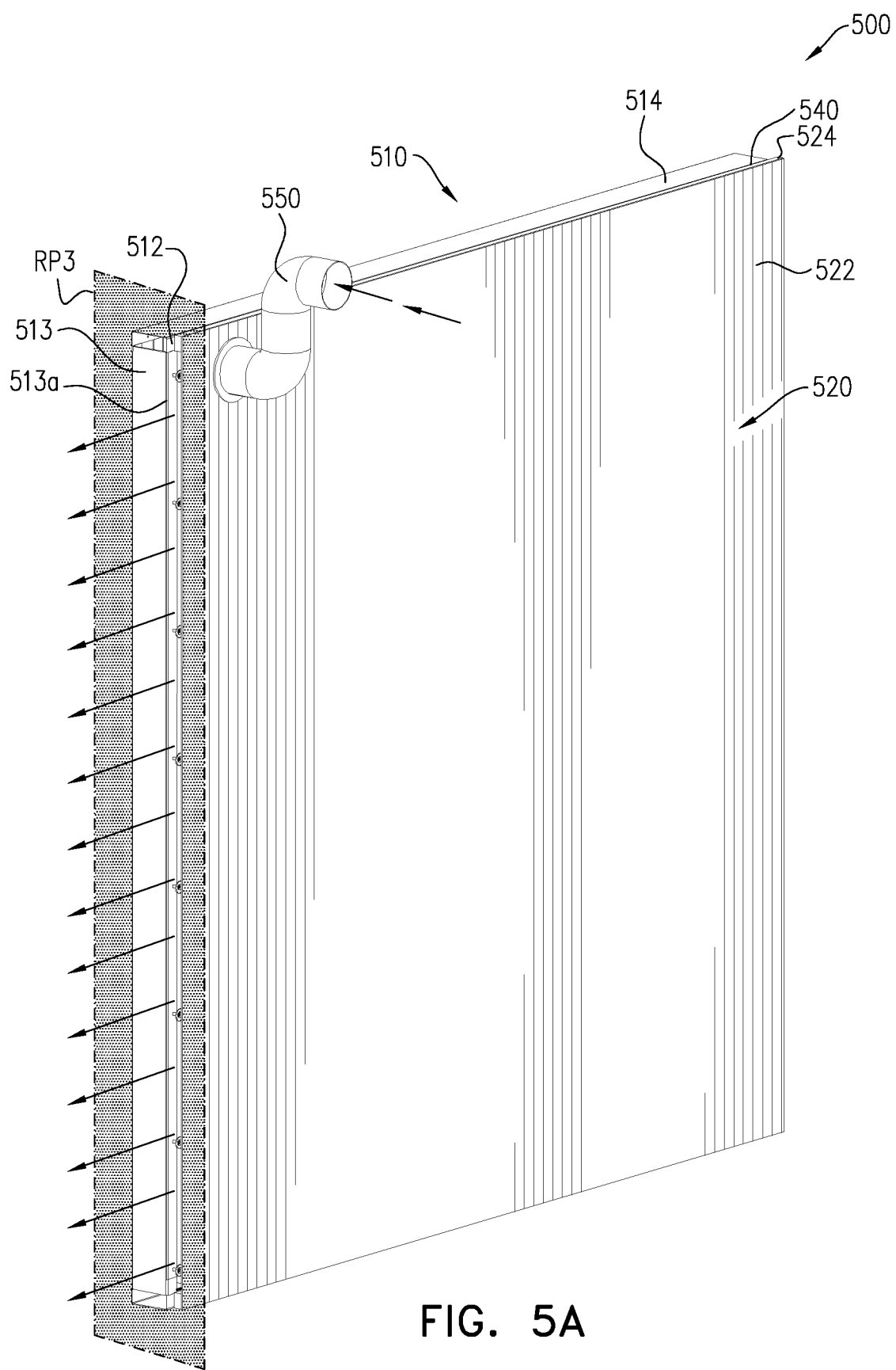
FIG. 5A illustrates a perspective view of a prefabricated construction wall assembly with an integral air duct, according to another example of the presently disclosed subject matter.
Figure 5B:
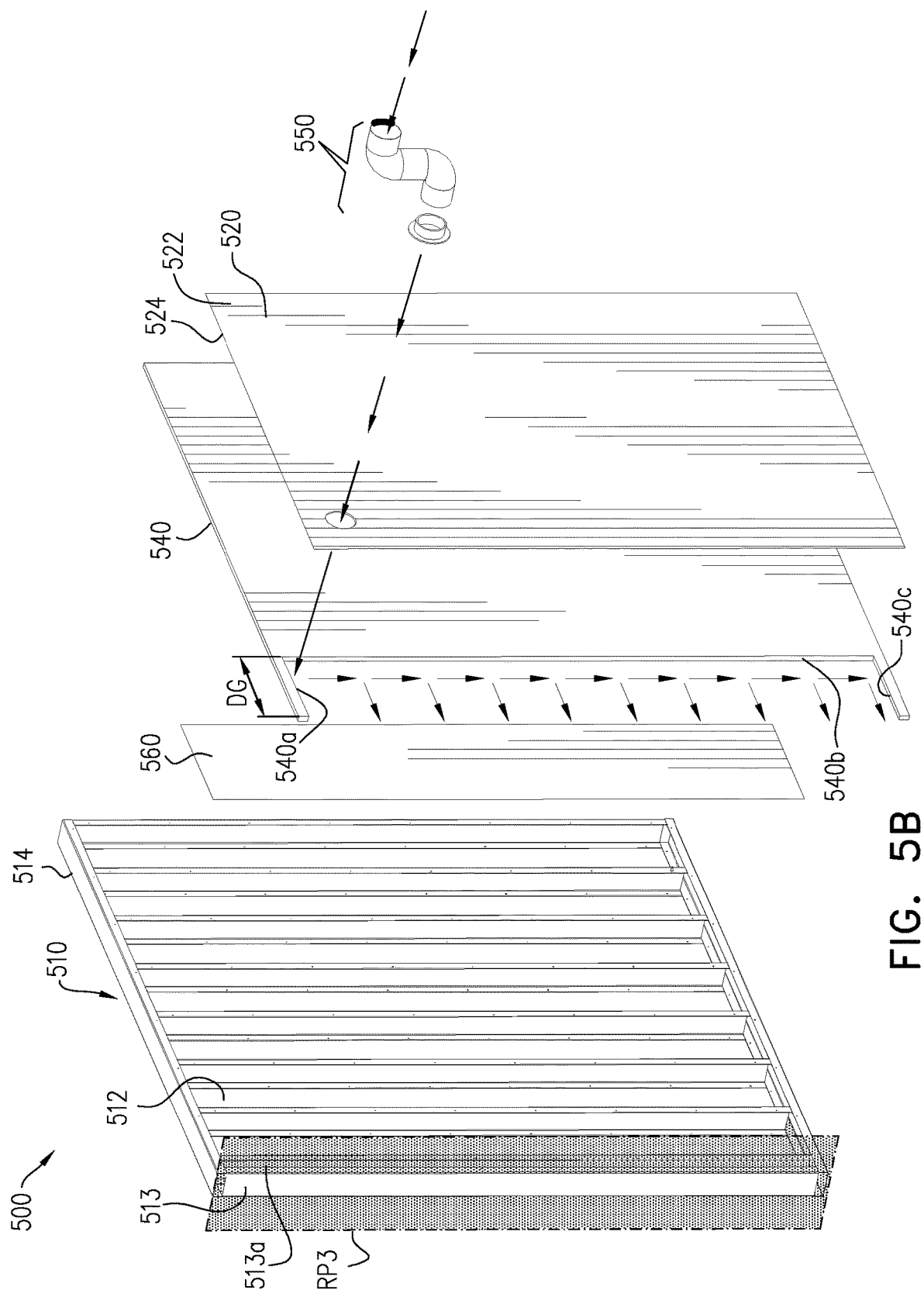
FIG. 5B illustrates an exploded perspective view of the prefabricated construction wall assembly of FIG. 5A.
Figure 5C:
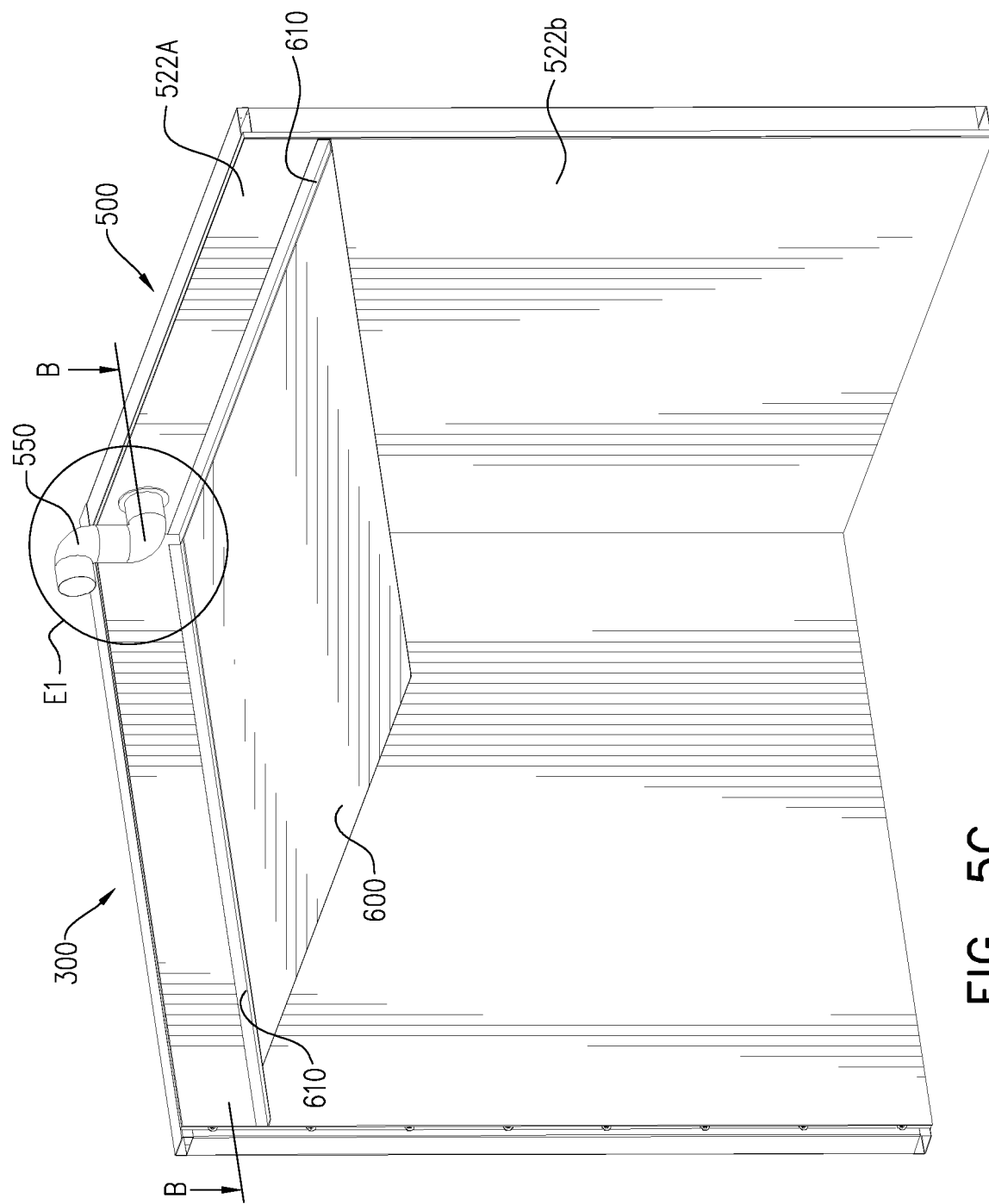
FIG. 5C illustrates a perspective view of the prefabricated construction wall assembly connected to another prefabricated construction wall assembly, for using the air duct of FIG. 5A.
Figure 5D:
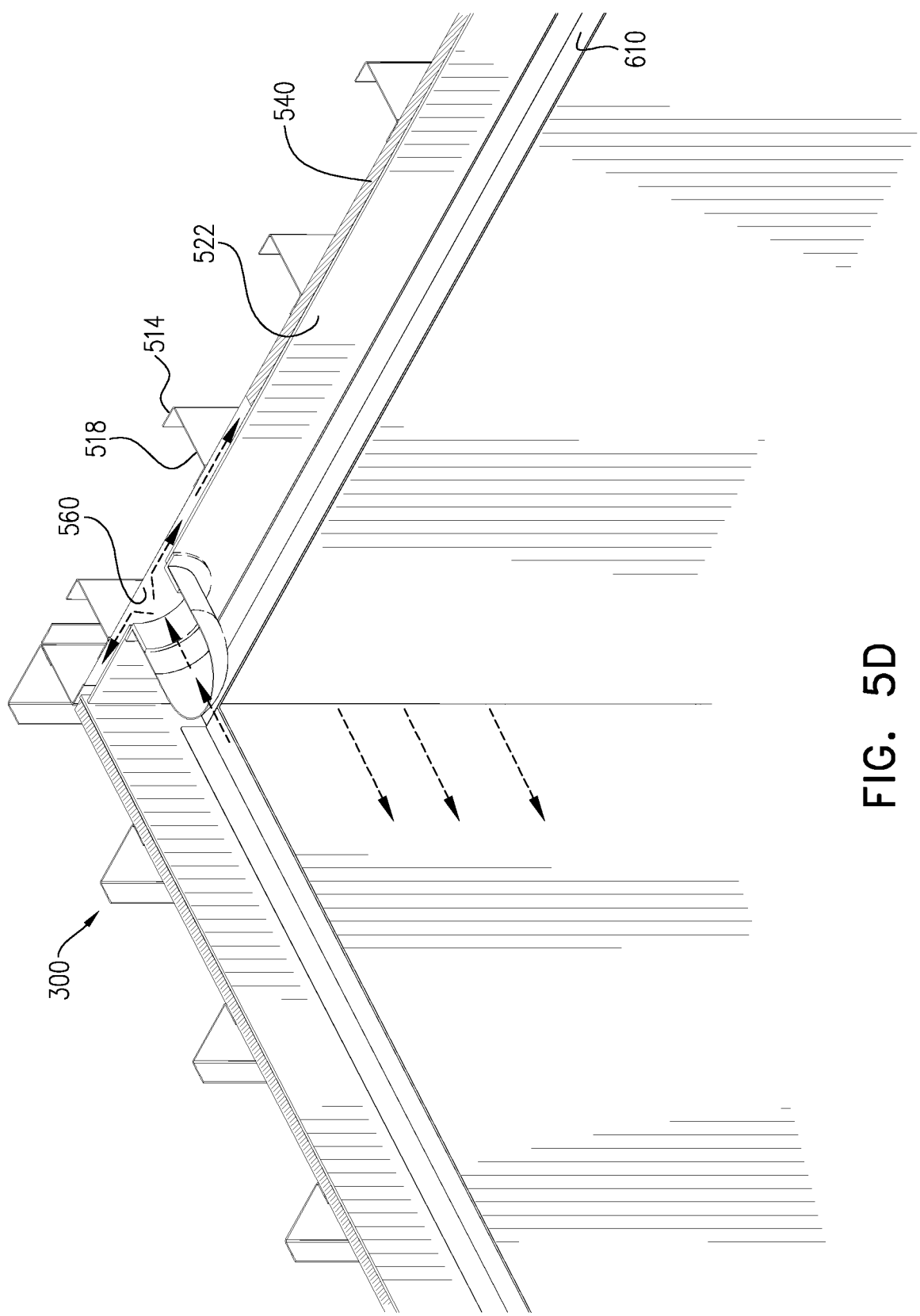
FIG. 5D illustrates an enlarged cross-sectional view along line B-B in FIG. 5C.
Figure 5E:
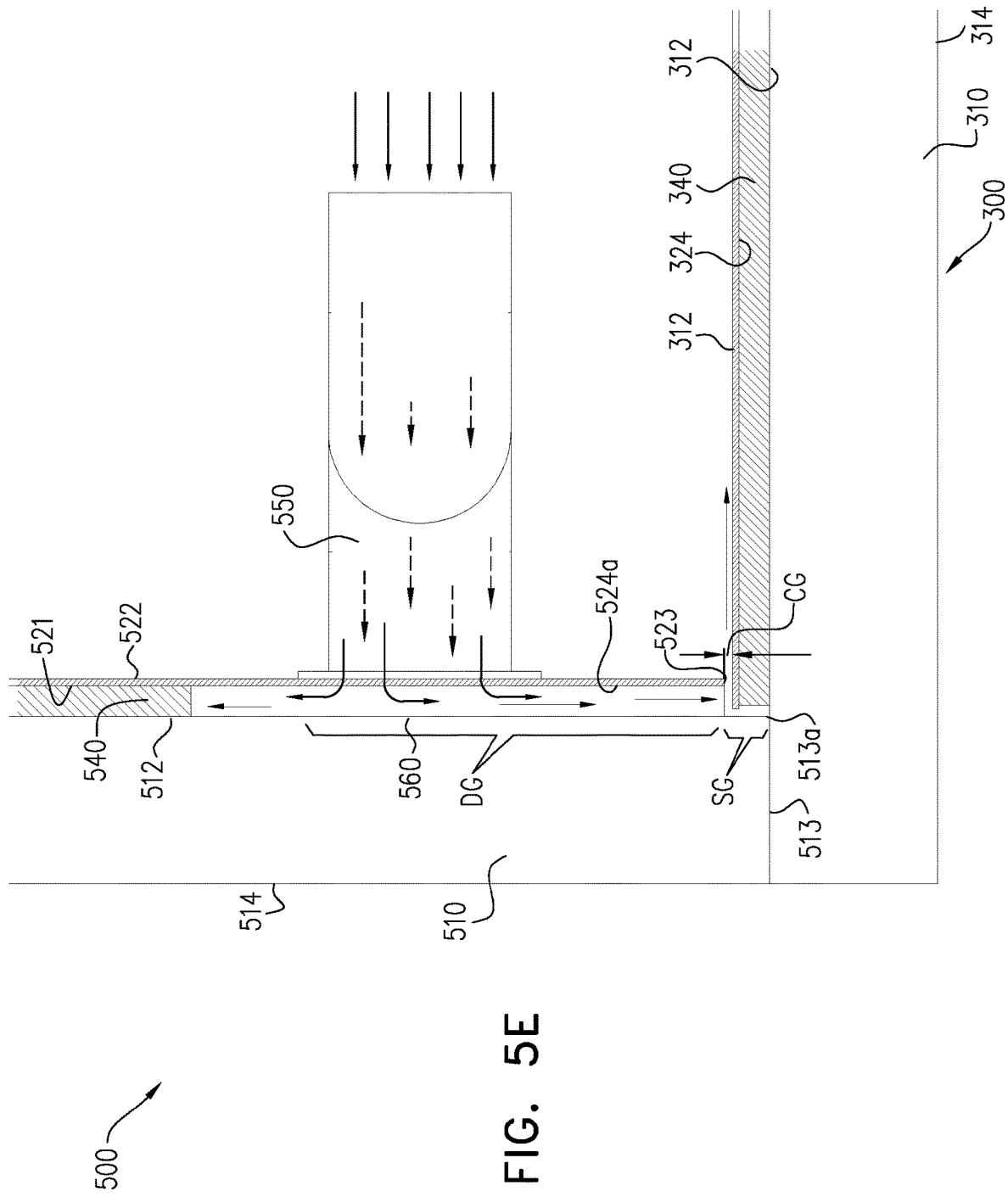
FIG. 5E illustrates an enlarged top cross-sectional view along line B-B in FIG. 5C.

Reference is now made to FIGS. 5A-5E which are schematic illustrations of a prefabricated construction wall assembly including an integral air duct of the presently disclosed subject matter, generally designated as 500.

The wall assembly 500 similar to and including all of the characteristics of the prefabricated construction wall assemblies 100, 200 or 300 previously disclosed hereinabove, further comprises a flange 560 adjacent to or being part of the frame structure 510. The flange 560 is disposed at least along the duct gap DG and at least along an interior portion 524a of an interior face 524 facing the duct gap DG, for facilitating flow of air through the duct gap DG.

The wall assembly 500 further comprises an air inlet/outlet 550, configured for providing fluid communication between an air source and the duct gap DG. The panel 520 has an air inlet 550 extending between the solid-surface exterior face 522 and the interior portion 524a.

The exterior face 522 of the panel 520 of the wall assembly 500 according this example, is configured to be connected to a ceiling member 600, for example by ceiling member connector 610. The ceiling member 600 dives the exterior face 522 of the panel 520 into an upper portion 522a, which is positioned above the ceiling member 600, and a bottom portion 522b, which is positioned beneath the ceiling member 600. The air inlet and/or outlet 550 is commonly disposed at the upper portion 522a of the exterior face 522. When connected to the exterior face 522 of the panel 520, the ceiling member 600 is commonly perpendicular to the exterior face 522 of the panel 520. Although not shown, air inlet and/or outlet 550 can be disposed at the lower portion 522*b* of the exterior face 522.

The frame structure has a first face 512, a second face 514 and a frame wall extending therebetween 513. The frame wall 513 including an outermost frame edge 513*a* which is at least partially lying in a frame reference plane RP3 which is perpendicular to the first face 512 and to the second face 514. Furthermore, the panel edge 523 faces the frame reference plane RP3, and is spaced from the frame reference plane RP3 thereby creating a side gap SG, which can be configured for facilitating the flow of the air from the duct gap DG therethrough.

In the wall assembly 500, a duct portion, spaced from the panel reference plane RP3 by a duct gap DG comprises a first sub-portion 540*a*, a third sub-portion 540*c* facing the first sub-portion 540*a* and a second sub-portion 540*b* extending therebetween and facing the panel reference plane RP3. The first sub-portion 540*a* and said third sub-portion 540*c* are closer to the panel reference plain RP3 than the second sub-portion 540*c*. Furthermore, the first sub-portion 540*a* is parallel to the third sub-portion 540*c*, and both the first sub-portion 540*a* and the third sub-portion 540*c* can be perpendicular to the second sub-portion 540*b*. The second sub-portion 540*b* can be parallel to the panel reference plane RP3.

Although not shown, the first sub-portion 540*a* and/or the third sub-portion 540*c* can be position with respect to the frame reference plane RP3 at an angle, e.g. different from 180°. Additionally, second sub-portion 540*b* does not have to be perpendicular to the first sub-portion 540*a* and/or to the third sub-portion 540*c*. In some embodiments the third sub-portion 540*c* can include the first sub-portion 540*a* or the second sub-portion 540*b*.

The DG is defined by the flange 560, the first sub-portion 540*a*, second sub-portion 540*b*, the third sub-portion 540*c* and by an interior portion 524*a* of an interior face 524. The duct gap DG can therefore be free of some or any material.

The prefabricated construction wall assembly 500 is used for enabling air flow into and/or out from an interior of building structure (e.g., a room). This air flow can be required as part of local regulations at different places around the world for providing proper air ventilation of the building structure. The structure of the prefabricated construction wall assembly 500, allows exploiting the structure and the shape of its buffer 540 to be used a duct for conveying the air into the interior of the building structure. Thus, using the duct gap DG for conveying the air therethrough, can eliminate using specially provided piping usually used for the above purpose and specially formed openings for this purpose.

The invention claimed is:

1. A prefabricated construction wall assembly, comprising:
    a frame structure having a first thermal expansion coefficient; and
    a panel configured for covering at least a majority of a face of the frame structure, said panel having a second thermal expansion coefficient different from the first thermal expansion coefficient, and a solid-surface exterior face exposed to an exterior of the prefabricated construction wall assembly and an interior face connected to the face of the frame structure so as to withstand thermal structural differences between the frame structure and the exterior face;
    a plurality of mechanical adapters for providing said connection of the interior face of the panel to the frame structure in a direct manner, wherein each of said plurality of mechanical adapters comprises:
        a first end configured to be securely introduced into the frame structure;
        a second end facing away from the first end and having a surface for mounting the interior face of the panel to said mechanical adapter; and
        a body extending between the first end and the second end;
        wherein said second end having a circumcircle diameter which is greater than a circumcircle diameter of the body;
    a stopper disposed onto said body between the first end and the second end, and having a circumcircle diameter which is greater than a circumcircle diameter of the first end, and configured for maintaining a predetermined distance between the interior face and the frame structure.

2. The prefabricated construction wall assembly according to claim 1, further comprising at least one spacer having a first face configured for facing the frame structure and an opposite second face configured for facing the interior face of the panel for maintaining a predetermined distance between the interior face and the frame structure.

3. The prefabricated construction wall assembly according to claim 1, further comprising a first buffer positioned between the interior face and the frame structure spaced along at least a majority of the panel.

4. The prefabricated construction wall assembly according to claim 1, wherein said frame structure is structured from tracks and studs.

5. The prefabricated construction wall assembly according to claim 4, further comprising a butting isolating material positioned within cavities formed between said tracks and/or studs.

6. The prefabricated construction wall assembly according to claim 5, wherein said surface of the second end defines a cavity for receiving an adhesive therein, and said cavity has an incircle diameter which is greater than or equal to the circumcircle diameter of the stopper.

7. The prefabricated construction wall assembly according to claim 5, further comprising at least one spacer having a first face configured for facing the frame structure and an opposite second face configured for facing the interior face of the panel for maintaining a predetermined distance between the interior face and the frame structure; and
    wherein said stopper is said spacer.

8. The prefabricated construction wall assembly according to claim 1, wherein the exterior face comprises one or more of the following materials: an acrylic polymer, a methyl methacrylate (MMA), an alumina trihydrate (ATH), a polyester, epoxy, or composite materials.

9. The prefabricated construction wall assembly according to claim 1, wherein said frame structure is made of one or more of the following materials:
    metal, wood, plastic, or composite materials.

10. The prefabricated construction wall assembly according to claim 1, further comprising a thermal conductive sheet which covers at least some portion of the interior side of the panel and is adhered thereto.

11. The prefabricated construction wall assembly of claim 10, further comprising at least one tube configured for conveying thermal conductive fluid, said at least one tube is positioned between the thermal conductive sheet and the interior side of the panel, wherein said at least one tube is thermally coupled to the thermal conductive sheet which is configured for dispersing heat.

12. The prefabricated construction wall assembly according to claim 1, wherein the thermal expansion coefficient of the panel is greater than the expansion coefficient of the frame constriction.

13. The prefabricated construction wall assembly according to claim 1, wherein the exterior face is factory-finished.

* * * * *